(12) United States Patent
Fujioka et al.

(10) Patent No.: US 7,679,698 B2
(45) Date of Patent: Mar. 16, 2010

(54) LIQUID CRYSTAL DISPLAY DEVICE

(75) Inventors: Kazuyoshi Fujioka, Osaka (JP); Tooru Sonoda, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 988 days.

(21) Appl. No.: 11/113,117

(22) Filed: Apr. 25, 2005

(65) Prior Publication Data

US 2005/0237455 A1  Oct. 27, 2005

(30) Foreign Application Priority Data

Apr. 23, 2004 (JP) ............................... 2004-128812
Apr. 8, 2005 (JP) ............................... 2005-111788

(51) Int. Cl.
*G02F 1/1335* (2006.01)

(52) U.S. Cl. ........................ 349/114; 349/110; 349/111; 349/138

(58) Field of Classification Search .................. 349/114
See application file for complete search history.

(56) References Cited

U.S. PATENT DOCUMENTS

| 6,654,076 | B2 | 11/2003 | Ha et al. | |
|---|---|---|---|---|
| 6,788,375 | B2 | 9/2004 | Ogishima et al. | |
| 7,113,238 | B2 | 9/2006 | Okumura | |
| 7,223,999 | B2* | 5/2007 | Jang et al. | 257/98 |
| 7,224,999 | B1* | 5/2007 | Yamaguchi | 455/566 |
| 7,251,000 | B2 | 7/2007 | Okumura | |
| 2002/0080320 | A1 | 6/2002 | Suzuki et al. | |
| 2003/0076464 | A1 | 4/2003 | Ozawa et al. | |
| 2004/0227876 | A1* | 11/2004 | Okumura | 349/114 |
| 2005/0024559 | A1* | 2/2005 | Okumura | 349/114 |
| 2005/0083459 | A1* | 4/2005 | Ukawa et al. | 349/114 |
| 2006/0139530 | A1 | 6/2006 | Ukawa et al. | |
| 2006/0146239 | A1 | 7/2006 | Ukawa et al. | |
| 2007/0200966 | A1 | 8/2007 | Jang et al. | |
| 2007/0247580 | A1 | 10/2007 | Okumura | |

FOREIGN PATENT DOCUMENTS

| CN | 1410812 A | 4/2003 |
|---|---|---|
| JP | 9-171175 A | 6/1997 |
| JP | 2002-287158 | 10/2002 |
| JP | 2003-167253 | 6/2003 |
| JP | 2003-195329 | 7/2003 |
| KR | 2003-0058012 A | 7/2003 |

OTHER PUBLICATIONS

Chinese Notification of Second Office Action and English translation thereof mailed Aug. 17, 2007 in corresponding CN application No. 2006100661698.

* cited by examiner

*Primary Examiner*—Richard H Kim
(74) *Attorney, Agent, or Firm*—Nixon & Vanderhye P.C.

(57) ABSTRACT

A vertical alignment liquid crystal display device includes: a pair of substrates which are arranged opposite each other; a liquid crystal layer which is interposed between the paired substrates; an interlayer insulating film which is formed on at least either the first substrate or the second substrate and provided with an aperture which is rectangular when viewed in plan and opened toward the other substrate; a transmissive region provided within the periphery of the aperture and performs transmissive display; and a reflective electrode which is arranged along the periphery of the aperture. The liquid crystal display device further includes a light shield for preventing light from passing through discontinuity regions which are included in a portion of the liquid crystal layer corresponding to the aperture and where liquid crystal molecules are oriented in a discontinuous manner.

24 Claims, 35 Drawing Sheets

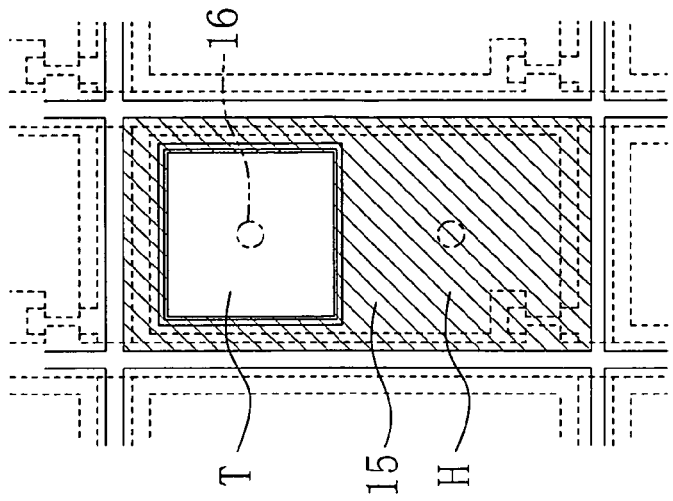
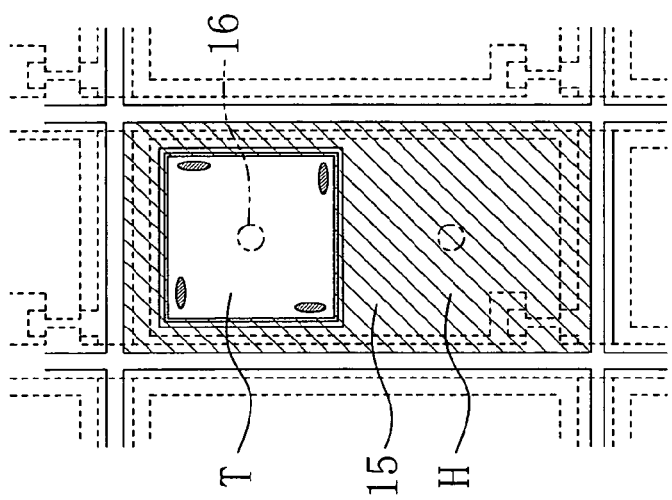
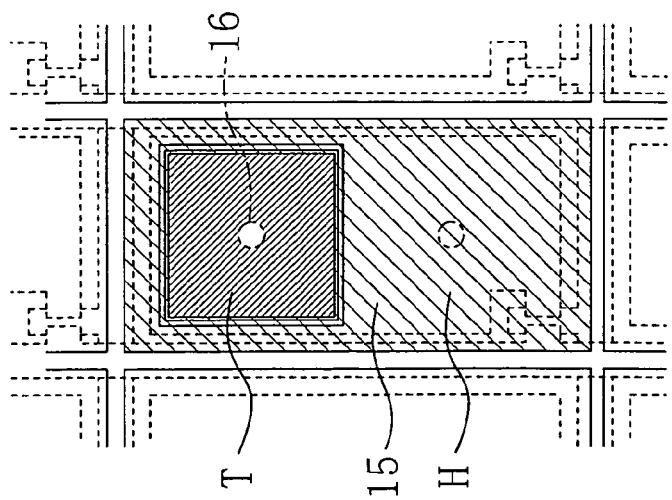

LIQUID CRYSTAL DISPLAY DEVICE

CROSS-REFERENCE TO RELATED APPLICATION

This non-provisional application claims priority under 35 U.S.C. §119(a) on Japanese Patent Applications Nos. 2004-128812 filed on Apr. 23, 2004 and 2005-111788 filed on Apr. 8, 2005, the entire contents of which are hereby incorporated by reference.

BACKGROUND OF THE INVENTION (a) Field of the Invention

The present invention relates to a vertical alignment liquid crystal display device including transmissive regions for transmissive display.

(b) Description of Related Art

So far, there have been known semi-transparent liquid crystal display devices including reflective regions for reflective display and transmissive regions for transmissive display (e.g., see Japanese Unexamined Patent Publication No. 2003-195329). Now, an explanation is given of a semi-transparent liquid crystal display device with reference to the drawings.

One of pixels in a vertical alignment semi-transparent liquid crystal display device is shown in a plan view of FIG. 30 and a sectional view of FIG. 31. The semi-transparent liquid crystal display device includes a TFT substrate 51 on which a plurality of thin film transistors (hereinafter referred to as TFTs) 10 have been formed one by one in every pixel and a counter substrate 52 which is arranged opposite the TFT substrate 51 with a liquid crystal layer 4 interposed therebetween. The vertical alignment liquid crystal display device achieves visual display with wide viewing angle and high contrast.

The TFT substrate 51 includes a glass substrate 2 on which the TFTs 10 and wires 11 are formed and a protective insulating film 17 made of silicon nitride or the like is stacked. A transparent electrode 14 is stacked on the protective insulating film 17. An interlayer insulating film 22 is formed also on the protective insulating film 17 to cover part of the transparent electrode 14 and a reflective electrode 15 is formed on the interlayer insulating film 22. More specifically, the interlayer insulating film 22 is provided for adjustment of a liquid crystal cell gap at the reflective region and made of a resin or the like. The reflective electrode 15, transparent electrode 14 and interlayer insulating film 22 are covered with a vertical alignment film 18 (e.g., polyimide).

As shown in FIG. 30, part of the pixel region where the interlayer insulating film 22 is not formed is a transmissive region T, while the other part of the pixel region provided with the interlayer insulating film 22 and the reflective electrode 15 is a reflective region H.

The reflective electrode 15 is made of aluminum having high reflectance, for example. The transparent electrode 14 is made of ITO (indium tin oxide) having high transmittance, for example. The electrodes 14 and 15 are physically and electrically in contact with each other and connected to a drain electrode of the TFT 10. When the TFT 10 is driven, a certain voltage is applied to the transparent electrode 14 and the reflective electrode 15 through the drain electrode.

The counter substrate 52 includes a glass substrate 1 provided with a color filter 21 and a transparent electrode (e.g., ITO) which serves as a counter electrode 19. The counter substrate 52 further includes structures 16 (hereinafter referred to as rivets) for controlling the orientation of liquid crystal molecules 3 when a voltage is applied. The rivets 16 are formed on parts of the counter electrode 19 corresponding to the transmissive region T and the reflective region H, respectively, and covered with a vertical alignment film (e.g., polyimide) together with the counter electrode 19.

The liquid crystal layer 4 is made of a liquid crystal composition introduced in a gap between the TFT substrate 51 and the counter electrode 52. Though not shown, polarizers and phase difference compensation films are adhered to the outer surfaces of the glass substrates 1 and 2.

In the semi-transparent liquid crystal display device including the thus configured pixels, the orientations of the liquid crystal molecules 3 located in the reflective region H and the transmissive region T are controlled by driving the TFT 10 in each pixel. The quantity of light passing through the polarizer is changed by the electrooptic effect of the liquid crystal, thereby achieving visual display. In the vertical alignment liquid crystal display device, the liquid crystal molecules 3 are oriented in the direction substantially vertical to the glass substrate 2 as shown in FIG. 31 when no voltage is applied. Therefore, the vertical alignment liquid crystal display device is allowed to realize wider viewing angle and higher contrast as compared with a liquid crystal display device in which the liquid crystal molecules 3 are oriented parallel to the glass substrate 2 when no voltage is applied.

Now, a detailed explanation is given of the configuration of the transmissive region T. The interlayer insulating film 22 is given with an aperture 53 which is rectangular when viewed in plan. In general, the transmissive region T is provided within the aperture 53. In particular, the transmissive region T shown in FIG. 30 is in the square form. Along the sides of the square-shaped transmissive region T, the interlayer insulating film 22 forms sloping faces 55. That is, part of the liquid crystal layer 4 existing in the transmissive region T is surrounded by the sloping faces 55 of the interlayer insulating film 22. Further, as shown in FIG. 31, the reflective electrode 15 is formed on the surface of the interlayer insulating film 22 such that the edge thereof slightly extends toward the center of the transmissive region T. The edge of the reflective electrode 15 is physically and electrically in contact with the transparent electrode 14.

The liquid crystal molecules 3 are oriented in the direction vertical to the vertical alignment film 18 as shown in FIG. 31 when no voltage is applied. On the other hand, when a voltage is applied, the liquid crystal molecules 3 existing in the transmissive region T show twisted orientation around the rivet 16 as shown in FIG. 32.

SUMMARY OF THE INVENTION

As to the conventional vertical alignment liquid crystal display devices as described above, there is a problem of difficulty in dramatically improving response speed for display by the transmissive region.

The present invention has been achieved in view of the problem. An object of the present invention is to effectively enhance the response speed for display by the transmissive region with a simple configuration and improve motion image display performance.

As a result of intensive studies on vertical alignment liquid crystal display devices including rectangular transmissive regions, the inventors of the present invention have found by themselves that the response speed of the liquid crystal molecules is lowered at certain regions of the transmissive region.

More specifically, as shown in FIG. 33, the liquid crystal molecules 3 near the rivet 16 in the transmissive region T are greatly influenced by the vertical alignment film 18 formed on the surface of the rivet 16. On the other hand, the liquid crystal molecules 3 near the sloping faces 55 of the interlayer insulating film 22 are greatly influenced by the vertical alignment film 18 formed on the sloping faces 55. Therefore, when a voltage is applied, the liquid crystal molecules 3 located outside a boundary shown in FIG. 33 by a broken line and those located inside the boundary are applied with orientation control forces of opposite directions. As a result, the orientation of the liquid crystal molecules 3 becomes unstable at certain regions, i.e., discontinuity regions 30.

Further, as shown in FIG. 32, the interlayer insulating film 22 includes four corners of the aperture 53. Since the liquid crystal molecules 3 are oriented in the direction vertical to the alignment film formed on the interlayer insulating film 22, the liquid crystal molecules 3 existing at the corners formed in the insulating film 22, where the direction of the normal to the alignment film changes drastically, are oriented discontinuously in the direction of the periphery of the aperture 53.

As a result, part of the liquid crystal molecules 3 in the liquid crystal layer existing at the corners of the aperture 53 (the transmissive region T) is influenced by the liquid crystal molecules 3 oriented in the different directions. Therefore, at the corners of the aperture 53 (the transmissive region T), the liquid crystal molecules 3 are oriented in a more discontinuous manner.

FIGS. 34A to 34C schematically show a change over time in the degree of light transmission through the transmissive region T when a voltage is applied. FIGS. 34A, 34B and 34C show the degree of light transmission 0 msec, 20 msec and 50 msec after the voltage application, respectively. FIG. 35 is an enlarged view of FIG. 34B and FIG. 36 is a photograph of an actual transmissive region T.

At discontinuity regions 30' generated at the corners of the transmissive region T, the degree of light transmission changes late to the voltage application. More specifically, it takes time to fix the orientation of the liquid crystal molecules 3 after the voltage application, thereby resulting in delay in response. Since the delay in response is visually observed as an afterimage during motion image display, the motion image display performance is greatly deteriorated. In a normal use environment, transmissive display is performed with higher quality as compared with reflective display by ambient light. Therefore, the delay in response is emphasized. Thus, as to the vertical alignment liquid crystal display device including the transmissive region T, it is ascertained that the liquid crystal molecules 3 at the four corners of the transmissive region T decrease in response speed, thereby leading to a decrease in response speed of the transmissive region T on the whole.

Therefore, in the present invention, discontinuity regions where the liquid crystal molecules are oriented unstably are identified and shielded from light so that the discontinuity regions do not contribute to the transmissive display.

More specifically, the present invention provides a vertical alignment liquid crystal display device including a plurality of pixels each having a transmissive region for transmissive display and a reflective region for reflective display surrounding the transmissive region, the vertical alignment liquid crystal display device comprising: a first substrate; a second substrate; a liquid crystal layer which is arranged between the first substrate and the second substrate; a backlight which is arranged to face a surface of the second substrate opposite to the first substrate and the liquid crystal layer; a first transparent electrode which is formed on the first substrate and functions as a counter electrode; an insulating layer which is formed on at least either the first substrate or the second substrate and provided with an aperture such that the wall surface of the insulating layer facing to the aperture forms a sloping face which is inclined to form an acute angle with the substrate on which the insulating layer is formed; a second transparent electrode which is arranged on part of the second electrode corresponding to the transmissive region and functions as a pixel electrode; a reflective electrode which is arranged on part of the second substrate corresponding to the reflective region and connected to the second transparent electrode at least at the periphery of the transmissive region and functions as a pixel electrode; an orientation control means which is arranged on part of either the first substrate or the second substrate located at the center of the transmissive region; and a light shield which prevents light emitted by the backlight from reaching a viewer through discontinuity regions included in a portion of the liquid crystal layer corresponding to the aperture, the discontinuity regions being regions where the orientation of liquid crystal molecules controlled by the orientation control means is discontinuous from the orientation of liquid crystal molecules above the sloping face of the insulating layer, the transmissive region performing transmissive display by transmitting light coming from the backlight through the aperture in the insulating layer, and the reflective region performing reflective display by reflecting ambient light.

Further, the present invention provides A vertical alignment liquid crystal display device including a plurality of pixels each having a transmissive region for transmissive display and a reflective region for reflective display surrounding the transmissive region, the vertical alignment liquid crystal display device comprising: a first substrate; a second substrate; a liquid crystal layer which is arranged between the first substrate and the second substrate; a backlight which is arranged to face a surface of the second substrate opposite to the first substrate and the liquid crystal layer; a first transparent electrode which is formed on the first substrate and functions as a counter electrode; an insulating layer which is formed on at least either the first substrate or the second substrate and provided with an aperture such that the wall surface of the insulating layer facing to the aperture forms a sloping face which is inclined to form an acute angle with the substrate on which the insulating layer is formed; a second transparent electrode which is arranged on part of the second electrode corresponding to the transmissive region and functions as a pixel electrode; a reflective electrode which is arranged on part of the second substrate corresponding to the reflective region and connected to the second transparent electrode at least at the periphery of the transmissive region and functions as a pixel electrode; an orientation control means which is arranged on part of either the first substrate or the second substrate located at the center of the transmissive region; and a light shield arranged along at least part of the periphery of the aperture to prevent light emitted by the backlight from reaching a viewer, the transmissive region performing transmissive display by transmitting light coming from the backlight through the aperture in the insulating layer, and the reflective region performing reflective display by reflecting ambient light.

The aperture is preferably rectangular when viewed in cross section parallel to the substrate on which the insulating layer is formed.

The light shield may be provided along the entire periphery of the aperture.

The light shield preferably comprises four light shields arranged at the four corners, respectively, of the aperture.

The light shields may be elongated rectangular in shape.

The light shields may be triangular in shape.

The light shields for the discontinuity regions arranged along the long sides of the aperture is preferably elongated more than those arranged along the short sides of the aperture.

The light shield may be arranged within the periphery of the aperture and a predetermined distance away from the edge of the reflective electrode arranged around the periphery of the aperture.

The light shield is preferably part of the reflective electrode and formed of a connecting part which connects the second transparent electrode and the reflective electrode.

The second substrate may be provided with a plurality of switching elements and the light shield may be formed of part of wiring material connected to the switching elements.

The first substrate may be provided with a black matrix for preventing light from passing through regions between pixels and the light shield may be made of the same material as the black matrix.

The aperture may include a receding region formed by shifting part of the wall surface of the insulating layer outward and the light shield is provided in the receding region.

According to the present invention, the discontinuity regions where the orientation of the liquid crystal molecules is unstable, which are visually observed during transmissive display, are identified and shielded from light. By so doing, the discontinuity regions are prevented from contributing to the transmissive display. That is, the regions where the response speed decreases are shielded from light so as to prevent the regions from contributing to the display, thereby improving the response speed of the transmissive region on the whole. This allows an improvement in motion image display performance with efficiency and achieves wide viewing angle and high contrast.

BRIEF DESCRIPTION OF THE DRAWINGS

FIGS. 34A to 34C are plan views illustrating a change in the degree of light transmission over time.

DETAILED DESCRIPTION OF THE INVENTION

Hereinafter, embodiments of the present invention will be described in detail with reference to the drawings, but the invention is not limited thereto.

Embodiment 1

Figure 1:
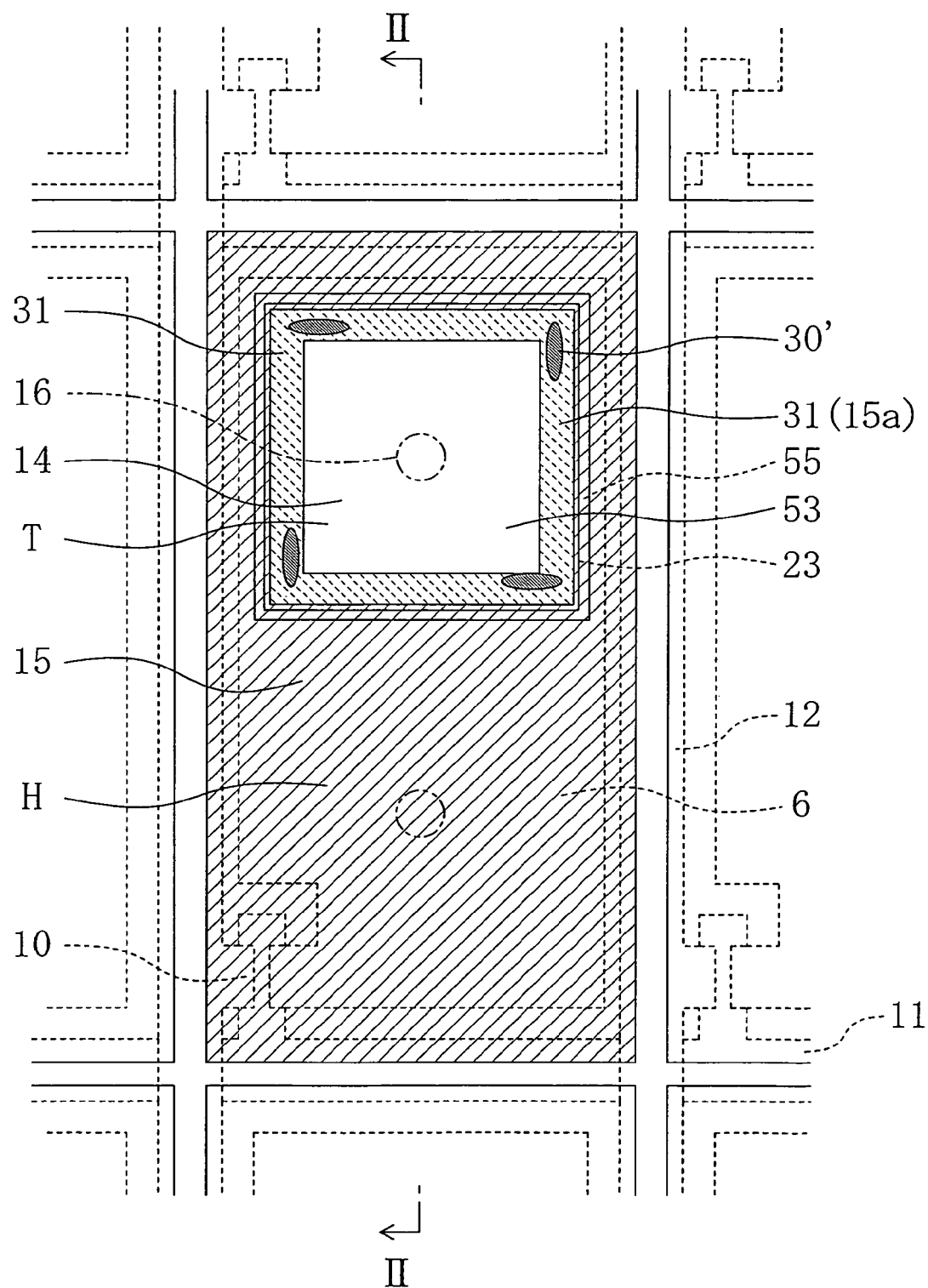
FIG. 1 is an enlarged plan view illustrating a liquid crystal display device of Embodiment 1.
Figure 2:
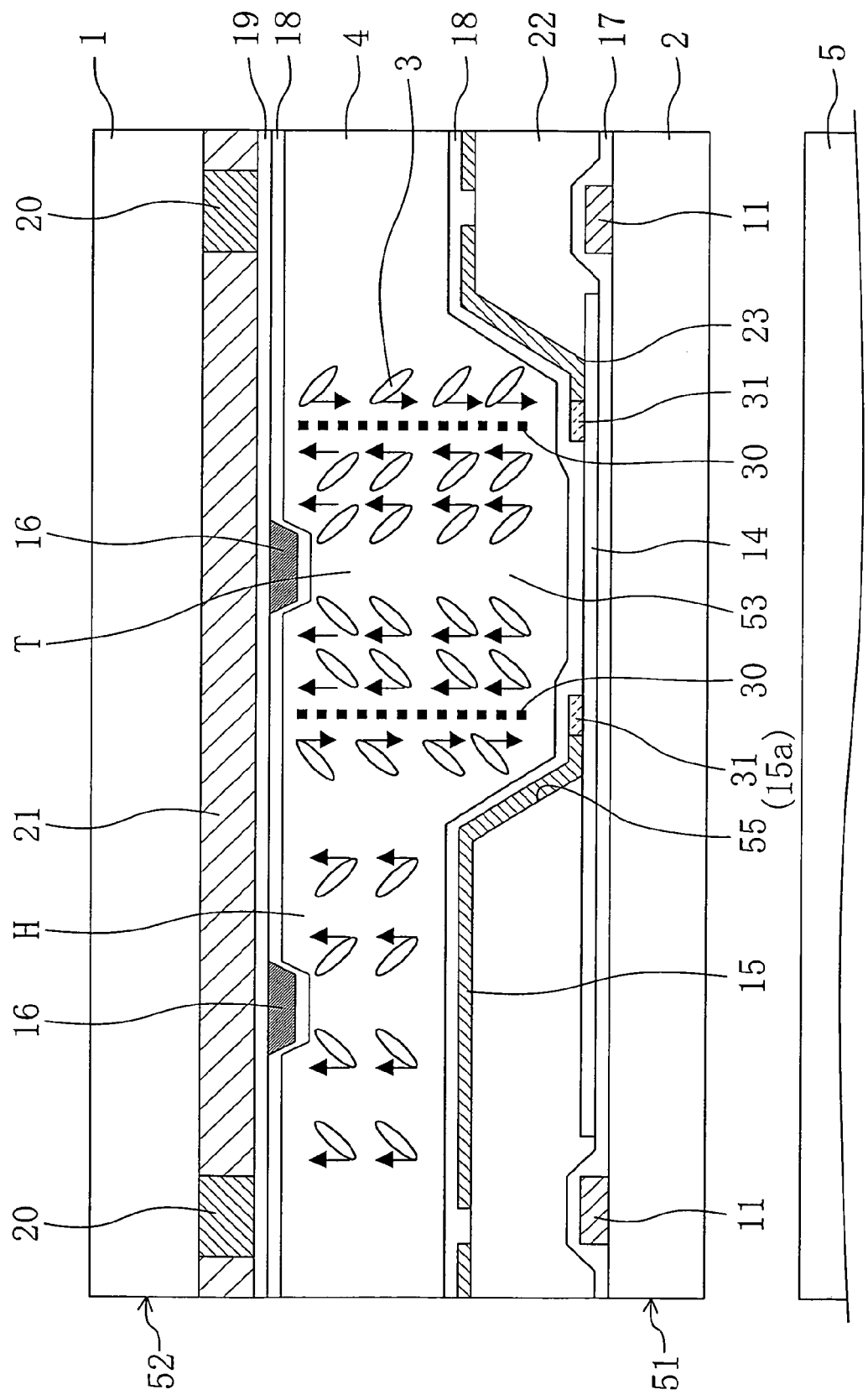
FIG. 2 is a sectional view taken along the line II-II shown in FIG. 1.

FIGS. 1 and 2 show a liquid crystal display device of Embodiment 1 of the present invention. FIG. 1 is an enlarged plan view illustrating a single pixel in the liquid crystal display device and FIG. 2 is a sectional view taken along the line II-II shown in FIG. 1.

As shown in FIG. 2, the liquid crystal display device includes a pair of substrates arranged opposite each other, i.e., a counter substrate 52 (a first substrate) and a TFT substrate 51 (a second substrate), a liquid crystal layer 4 interposed between the TFT substrate 51 and the counter substrate 52 and a backlight 5 which is arranged to face a surface of the TFT substrate 51 opposite to the counter substrate 52 and the liquid crystal layer 4. The liquid crystal display device further includes pixels 6 arranged in matrix configuration and TFTs 10 which are arranged one by one in each pixel and function as switching elements as shown in FIG. 1. Each of the pixels 6 of the liquid crystal display device includes a transmissive region T for transmissive display and a reflective region H for reflective display.

The TFT substrate 51 includes a glass substrate 2 provided with the TFTs 10 and wires 11 such as scanning wires and signal wires connected to the TFTs 10 and a protective insulating film 17 made of silicon nitride and stacked thereon. On the protective insulating film 17, a second transparent electrode 14 which functions as a pixel electrode is stacked. The second transparent electrode 14 is made of ITO (indium tin oxide) of high transmittance, for example. As a wall-like structure, an interlayer insulating film 22 is formed on the protective insulating film 17 to cover part of the second transparent electrode 14.

The interlayer insulating film 22 may be a resin layer and provided with an aperture 53 which penetrates the interlayer insulating film 22 in the direction in which the TFT substrate 51 and the counter substrate 52 are opposite each other. The aperture 53 is in the form of a rectangle, especially a square, when viewed in cross section parallel to the glass substrate 2 of the TFT substrate 51. The wall surfaces of the interlayer insulating film 22 facing to the aperture 53 form sloping faces 55 which are inclined to form an acute angle of 45° with the glass substrate 2, for example. Accordingly, when viewed in cross section (horizontal cross section parallel to the glass substrate 2), the aperture 53 is reduced in size in the direction from the counter substrate 52 to the TFT substrate 51 as shown in FIG. 2. That is, the planar shape of the aperture 53 near the counter substrate 52 and that of the aperture 53 near the glass substrate 2 are both rectangular. Further, the planar shape of the aperture 53 near the glass substrate 2 is smaller than that of the aperture 53 near the counter substrate 52. Hereinafter, the planar shape of the aperture 53 near the glass substrate 2 may be referred to as a rectangular region 23.

On part of the surface of the interlayer insulating film 22, a reflective electrode 15 which functions as a pixel electrode is formed. More specifically, the reflective electrode 15 is formed on the surface of the interlayer insulating film 22 facing to the counter electrode 52 and the sloping faces 55 of the interlayer insulating film 22 provided along the periphery of the aperture 53. The reflective electrode 15 is made of aluminum having high reflectance, for example.

The edge of the reflective electrode 15 extends into the rectangular region 23 of the aperture 53. The edge of the reflective electrode 15, or a connecting part 15a, brings the second transparent electrode 14 and the reflective electrode 15 into physical and electrical contact. In other words, the connecting part 15a connects the second transparent electrode 14 and the reflective electrode 15 formed above the TFT substrate 51. The connecting part 15a is part of the reflective electrode 15.

The second transparent electrode 14 and the reflective electrode 15 are connected to a drain electrode of the TFT 10. When the TFT 10 is driven, a certain voltage is applied to the second transparent electrode 14 and the reflective electrode 15 through the drain electrode. The reflective electrode 15, second transparent electrode 14 and interlayer insulating film 22 are covered with a vertical alignment film 18 (e.g., polyimide). When no voltage is applied, the vertical alignment film 18 allows liquid crystal molecules 3 in the liquid crystal layer 4 to be oriented in the direction vertical to the vertical alignment film 18.

The transmissive region T is a region between the TFT substrate 51 and the counter substrate 52 and allows light from the backlight 5 to pass through the aperture 53 within the edge of the connecting part 15a. More specifically, as shown in FIG. 1, the transmissive region T is provided within the edge of the connecting part 15a and in the form of a rectangle when viewed in cross section parallel to the TFT substrate 51 (or the counter substrate 52). With this configuration, the transmissive region T allows transmissive display by transmitting light through the aperture 53 in the interlayer insulating film 22.

The reflective region H is a region which is provided around the transmissive region T and provided with the reflective electrode 15 formed on the interlayer insulating film 22 for reflecting ambient light, thereby achieving display. The interlayer insulating film 22 is provided for adjustment of the cell gap of the liquid crystal layer 4 existing in the reflective region H. The liquid crystal layer 4 is thinner in the reflective region H than in the transmissive region T.

The aperture 53 may be polygonal in shape having not less than three to not more than eight corners when viewed in cross section parallel to the TFT substrate 51. Or alternatively, the corners may be rounded. The interlayer insulating film 22 may have a plurality of wall surfaces facing to the aperture 53 and at least one of them may form the sloping face 55.

As shown in FIG. 2, the counter substrate 52 includes a glass substrate 1 formed with a color layer 21 for forming a color filter and a black matrix 20 for preventing light from passing through regions surrounding the pixels. The color layer 21 and the black matrix 20 are covered with a first transparent electrode 19 (ITO or the like) which functions as a counter electrode. The first and second transparent electrodes 19 and 14 are arranged as a pair of transparent electrodes which are opposite each other within the transmissive region T.

On the surface of the first transparent electrode 19, orientation control means 16 (e.g., rivets) for controlling the orientation of the liquid crystal molecules 3 are formed. The rivets 16 are arranged on parts of the first transparent electrode 19 located at the centers of the transmissive region T and the reflective region H, respectively, as shown in FIGS. 1 and 2. Further, a vertical alignment film 18 is stacked on the surface of the first transparent electrode 19 to cover the rivets 16. The vertical alignment film 18 is the same as that formed above the TFT substrate 51.

Thus, the liquid crystal molecules 3 are oriented in the direction vertical to the vertical alignment film 18 when no voltage is applied. On the other hand, when a voltage is applied, the orientation of the liquid crystal molecules 3 becomes axially symmetric to the rivet 16 in the transmissive region T as viewed in plan.

In the aperture 53, a portion of the liquid crystal layer 4 corresponding to the aperture 53 includes regions 30 where the orientation of the liquid crystal molecules 3 controlled by the rivet 16 is discontinuous from the orientation of the liquid crystal molecules 3 above the sloping faces 55 of the interlayer insulating film 22 (hereinafter referred to as discontinuity regions 30). As a feature of the present invention, the liquid crystal display device includes a light shield 31 which prevents light emitted by the backlight 5 from reaching a viewer through the discontinuity regions 30.

The light shield 31 is formed of the connecting part 15a and shaped like a rectangular ring provided along the entire periphery of the aperture 53 as shown in FIG. 1. That is, the light shield 31 is formed along the sides of the rectangular transmissive region T. In general, the connecting part 15a is extended toward the center of the aperture 53 to such a degree that electrical connection between the second transparent electrode 14 and the reflective electrode 15 is ensured. In this embodiment, however, the connecting part 15a is further extended in the same direction to prevent light from passing through the discontinuity regions 30 generated along the periphery of the transmissive region T. In this way, the light shield 31 in the form of a rectangular ring prevents light from passing through the regions 30 where the liquid crystal molecules 3 are oriented in a discontinuous manner.

Manufacturing Method

Hereinafter, an explanation is given of a method for manufacturing the liquid crystal display device of the present embodiment.

The liquid crystal display device is a 6.5-inch liquid crystal display device. A display screen has an effective size of 143.00 mm in lateral length and 79.320 mm in longitudinal length. The number of pixels included is 400×3 (RGB)× 240=288,000. The pixel size is 0.1195 mm in lateral length and 0.3305 mm in longitudinal length.

The TFT substrate 51 is prepared in the following manner. First, TFTs 10 are formed on a glass substrate 2 as shown in FIG. 1 by a common technique. Then, a protective insulating film 17 made of silicon nitride is formed on the TFTs 10 and the wires 11 shown in FIG. 2 to protect them. ITO is used as a drain electrode. The drain electrode functions also as a second transparent electrode 14 in the transmissive region T.

Then, for adjustment of the cell gap of the liquid crystal layer 4 existing in the reflective region H, an interlayer insulating film 22 is formed in the reflective region H by photolithography. The interlayer insulating film 22 is 2 µm in thickness and made of a photosensitive acrylic resin having a dielectric constant $\in$ of 3.7. In the interlayer insulating film 22, an aperture 53 is formed. The aperture 53 is rectangular when viewed in cross section parallel to the TFT substrate 51. The aperture 53 is so formed that the rectangular shape thereof gradually increases in the direction from the TFT substrate 51 to the counter substrate 52. That is, the four wall surfaces of the interlayer insulating film 22 surrounding the aperture 53 form sloping faces 55, respectively, which are inclined relative to the glass substrates 1 and 2. The rectangular region 23 of the aperture 53 near the glass substrate 2 is 83 mm in longitudinal and lateral lengths. The sloping faces 55 are provided in 2 µm from the edge of the interlayer insulating film 22. Thus, the transmissive region T is provided within the aperture 53.

Subsequently, a reflective electrode 15 made of aluminum is formed on the interlayer insulating film 22. To prevent direct contact between aluminum and ITO and the resulting corrosion, a molybdenum layer is formed below the aluminum layer. The molybdenum layer will be patterned simultaneously with the aluminum layer. Then, the aluminum layer are removed from the transmissive region T by patterning and at the same time, a light shield 31 is provided as shown in FIGS. 1 and 2 to prevent light from passing through discontinuity regions 30 where the liquid crystal molecules 3 are oriented in a discontinuous manner.

Then, a vertical alignment film 18 made of polyimide (Optomer AL manufactured by JSR) of about 600 Å in thickness is formed over a display region on the surface of the TFT substrate 51.

Then, the counter substrate 52 is prepared in the following manner. First, a color layer 21 and a black matrix 20 shown in FIG. 2 are formed on a glass substrate 2 by patterning. An acrylic resin added with a pigment is used as material for the color layer 21 and the black matrix 20. Then, a first transparent electrode 19 which functions as a counter electrode and is made of ITO is formed over the color layer 21 and the black matrix 20. Then, orientation control means (rivets) 16 made of an acrylic resin are formed thereon in the form of an upside down dish of 15 µm in maximum diameter and 1.3 µm in maximum thickness. Further, spacers (not shown) which define the thickness of the liquid crystal layer 4 are made of an acrylic resin are formed in the cylindrical shape of 12 µm in diameter and 1.7 µm in thickness.

Subsequently, a vertical alignment film 18 (Optomer AL manufactured by JSR) of about 600 Å in thickness is formed over the surface of the resulting counter substrate 52 in the same manner as on the TFT substrate 51.

Then, the TFT substrate 51 and the counter substrate 52 are bonded together using a thermosetting sealing resin. Then, the gap between the TFT substrate 51 and the counter substrate 52 is vacuum-filled with liquid crystal material to form a liquid crystal layer 4 as shown in FIG. 2. Liquid crystal molecules 3 in the liquid crystal layer 4 have birefringence Δn of 0.098, negative dielectric anisotropy and $\Delta\in$ of −3.7. Further, a levorotatory chiral dopant is added thereto so that the spiral pitch of the liquid crystal molecules 3 is set to 60 µm.

In this way, the liquid crystal display device is produced.

Figure 3:
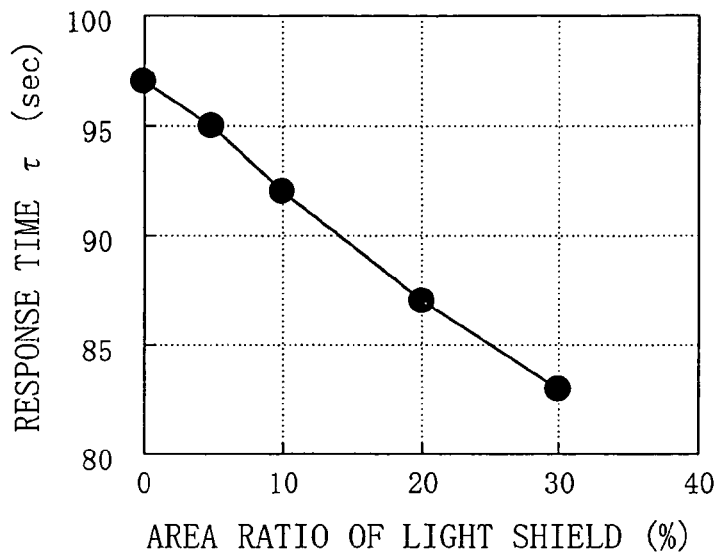
FIG. 3 is a graph illustrating a relationship between the area ratio of a light shield and response time.
Figure 28:
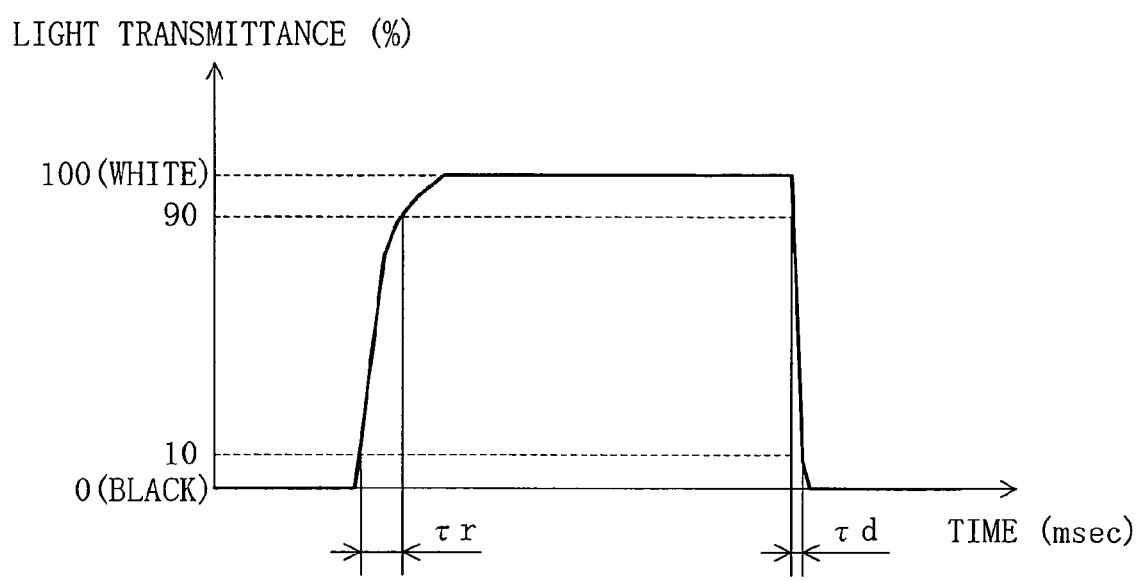
FIG. 28 is a graph illustrating the definition of response time.

Then, response time of the liquid crystal display device shown in FIG. 1 was measured while the area ratio of the light shield 31 to the aperture 53 (the rectangular region 23 ) was varied. FIG. 3 shows the measurement results. The environment temperature during the measurement was 25° C. The response time of the liquid crystal display device is defined as follows. As shown in FIG. 28, during inversion from black/white display to white/black display, time required for changing the display from 10% light transmittance to 90% light transmittance is defined as time τr, while time required for changing the display from 90% light transmittance to 10% light transmittance is defined as time τd. Under these conditions, response time τ is defined as τ=τr+τd.

As shown in FIG. 3, in a conventional liquid crystal display device which was not provided with the light shield 31 (i.e., the connecting part 15a was not extended), the area ratio of the light shield 31 was 0% and the response time τ was 97 msec. On the other hand, when the light shield 31 was provided, the response time τ was reduced with an increase in area ratio of the light shield 31. When the area ratio of the light shield 31 is raised to 30%, the response time r was reduced down to 83 msec.

Figure 4:
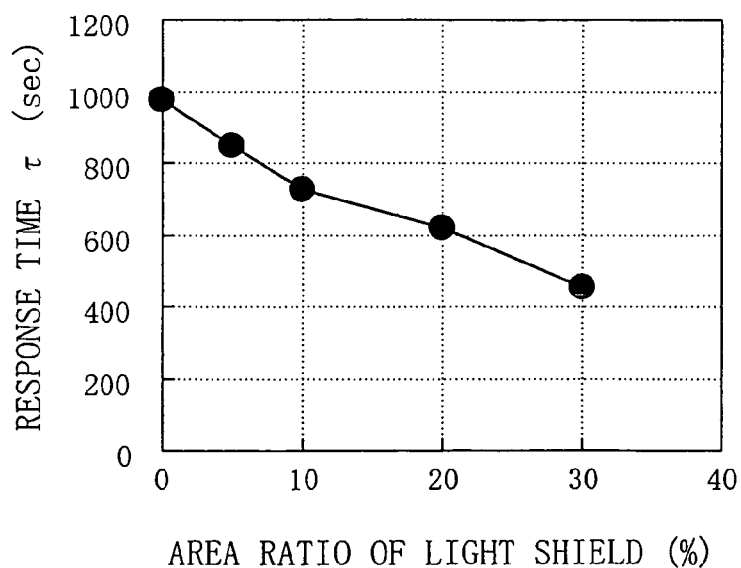
FIG. 4 is a graph illustrating a relationship between the area ratio of a light shield and response time.
Figure 5:
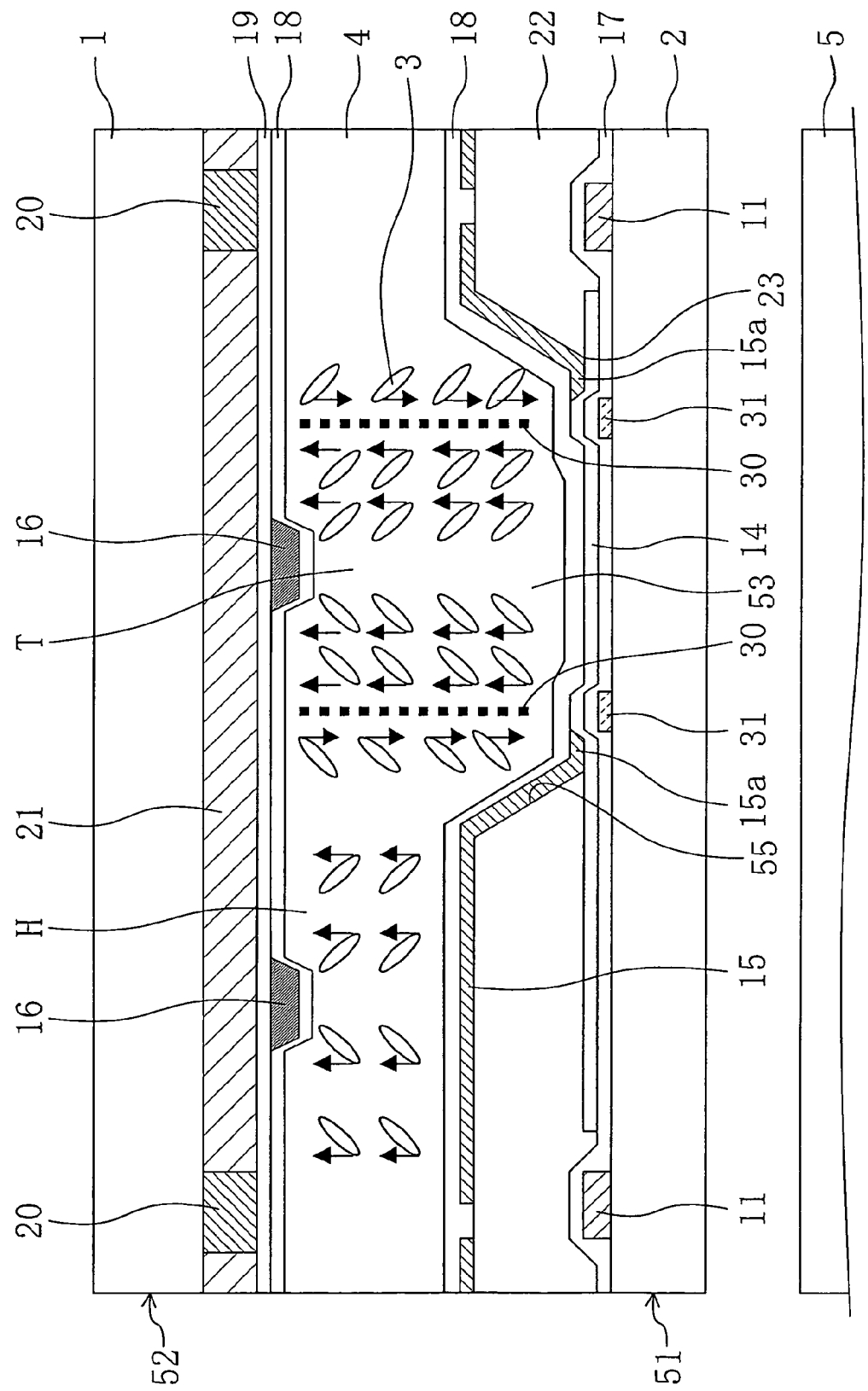
FIG. 5 is an enlarged sectional view illustrating another example of Embodiment 1.

FIG. 4 shows the results of the measurement carried out at the environment temperature of −20° C. As shown in FIG. 4, in the conventional liquid crystal display device which was not provided with the light shield 31, the area ratio of the light shield 31 was 0% and the response time τ was 975 msec. Also in this case, the response time τ was reduced with an increase in area ratio of the light shield 31. When the area ratio of the light shield 31 is raised to 30%, the response time τ was drastically reduced to 452 msec, which is less than ½ of the response time measured when the light shield 31 was not formed. That is, the liquid crystal display device of this embodiment is effectively applicable to liquid crystal display devices for outdoor use, such as use in vehicles, cellular phones and PDAs. Even in a low temperature environment, the liquid crystal display device works with high speed response.

Thus, according to Embodiment 1, the light shield 31 is formed for certain regions 30 where the liquid crystal molecules 3 are oriented in a discontinuous manner. Therefore, the regions where the response speed decreases are shielded from light so as not to contribute to the transmissive display. Thus, the transmissive region T not shielded from light by the light shield 31 improves in response speed for display with efficiency on the whole. As a result, visual display is achieved with wide viewing angle and high contrast and motion image display performance improves with efficiency.

Since the light shield 31 is formed by extending the connecting part 15a, the light shield 31 is formed easily without making any drastic change in existing manufacturing methods. This allows cost reduction.

It is not always necessary to extend the connection part 15a to form the light shield 31. For example, the light shield 31 may be made of part of material for the wires 11 (scanning wires or signal wires). More specifically, the light shield 31 may be patterned into a rectangular ring shape when viewed in plan simultaneously with the step of forming the wires 11. This also offers the same effect as in Embodiment 1 described above.

Figure 6:
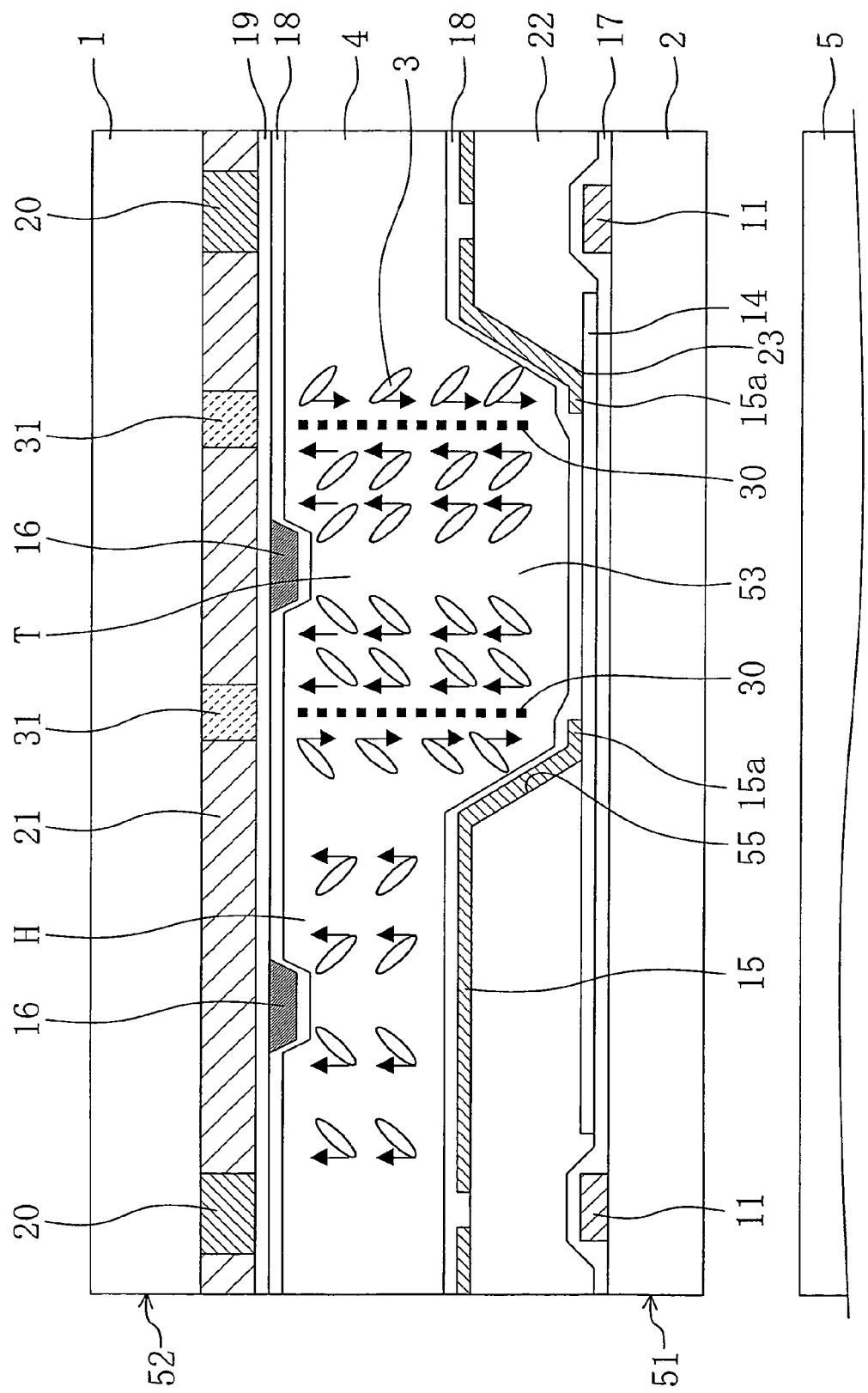
FIG. 6 is an enlarged sectional view illustrating still another example of Embodiment 1.

Further, as shown in FIG. 6, the light shield 31 may be provided for the counter substrate 52 and may be made of material for forming the black matrix 20. More specifically, the light shield 31 may be patterned into a rectangular ring shape when viewed in plan simultaneously with the step of forming the black matrix 20. This also offers the same effect as in Embodiment 1 described above.

In this embodiment, the orientation control means is formed of an insulating layer and shaped like an upside down dish on the first substrate. However, it may be constituted of a slit formed in the second transparent electrode 14 which functions as a pixel electrode.

Embodiment 2

FIGS. 7 to 10 show a liquid crystal display device according to Embodiment 2 of the present invention. In the following embodiments, components same as those shown in FIGS. 1 to 6 are given with the same reference numerals and a detailed explanation thereof is omitted.

Figure 7:
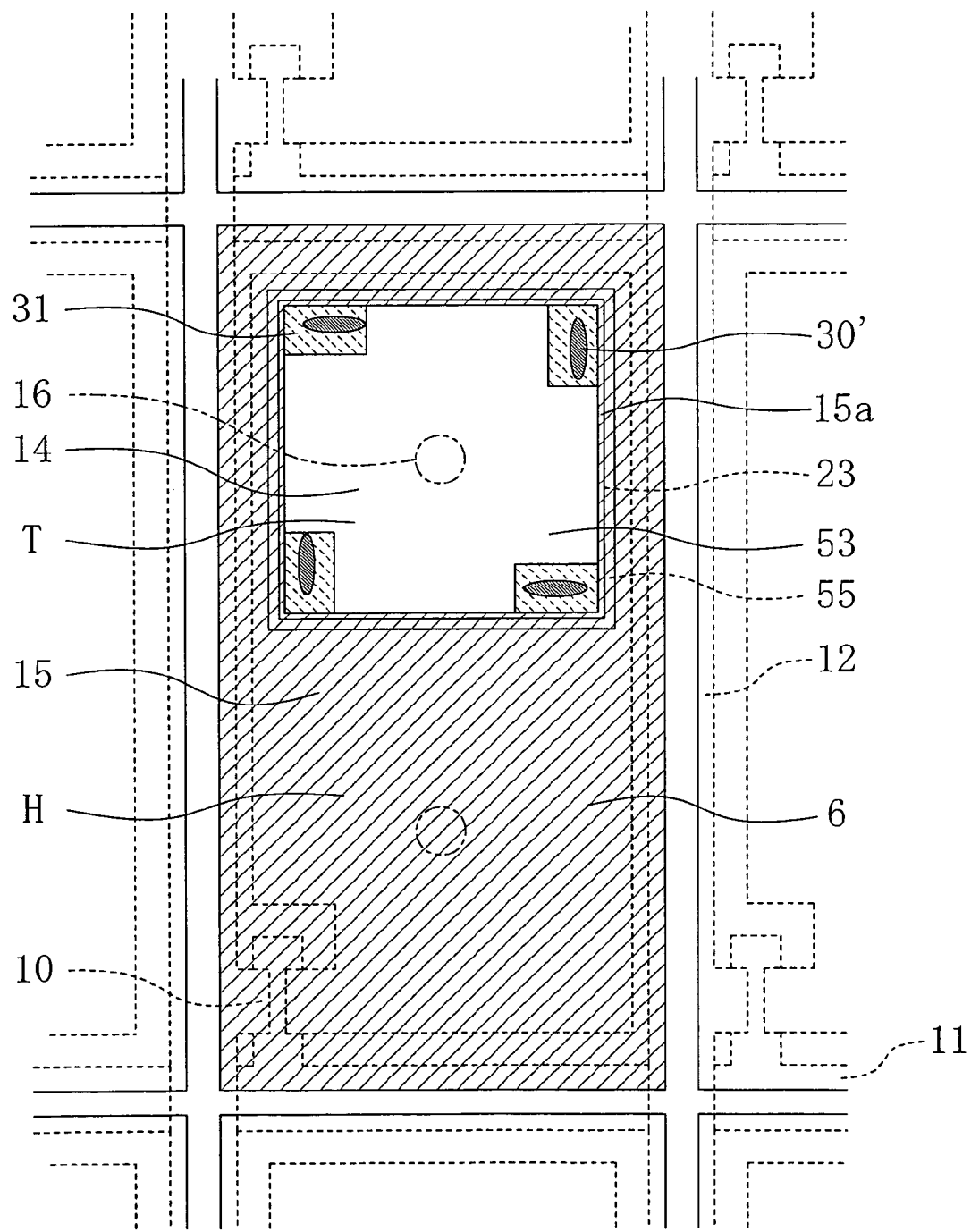
FIG. 7 is an enlarged plan view illustrating a liquid crystal display device of Embodiment 2.

A liquid crystal display device of this embodiment includes light shields 31 which prevent light from passing through regions at the four corner regions of the aperture 53 as shown in FIG. 7.

The inventors of the present invention have identified regions where the response speed of the liquid crystal molecules 3 decreases. Accordingly, they provided the light shields 31 at the certain regions 30' where the liquid crystal molecules 3 are oriented in a discontinuous maimer.

As shown in FIG. 7, each of the light shields 31 is in the form of an elongated rectangle when viewed in plan and arranged along the sides of the aperture 53 (the transmissive region T). One of the long sides and one of the short sides of the elongated rectangular light shield 31 are aligned with the edge of the connecting part 15a when viewed in plan. The light shields 31 may be formed by extending the connecting part 15a in the same manner as in Embodiment 1. Or alternatively, the light shields 31 may be made of the same material as the wires 11 or the same material as the black matrix 20.

This embodiment offers the same effect as Embodiment 1 and in addition, increases the area of the transmissive region T, thereby enhancing the aperture ratio and improving display quality.

Figure 8:
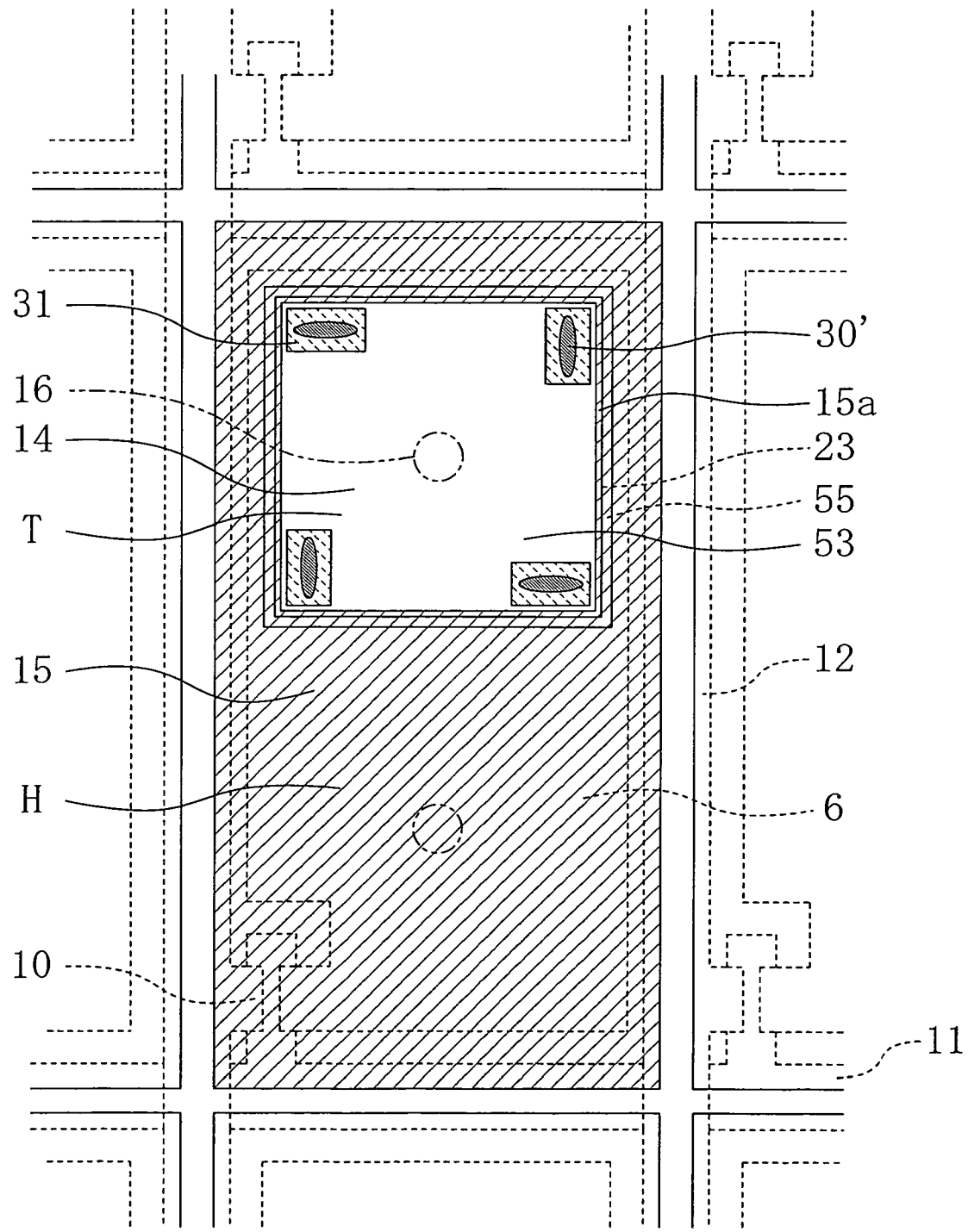
FIG. 8 is an enlarged sectional view illustrating another example of Embodiment 2.

The shape of the light shields 31 is not limited to that shown in FIG. 7. For example, as shown in FIG. 8, the light shields 31 may be arranged a predetermined distance away from the connecting part 15a when viewed in plan. More specifically, each of the elongated rectangular light shields 31 is arranged such that one of the long sides and one of the short sides thereof are located a predetermined distance away from the edge of the connecting part 15a.

According to the study of the inventors, it has been found that the discontinuity regions 30' where the liquid crystal molecules 3 are oriented in a discontinuous manner to cause reduction in response speed are generated slightly away from the connecting part 15a when viewed in plan as shown in FIG. 8. Therefore, if the space between the connecting part 15a and the discontinuity regions 30' is not shielded from light but used as the display region, the aperture ratio increases, thereby improving the display quality to a higher degree.

Figure 9:
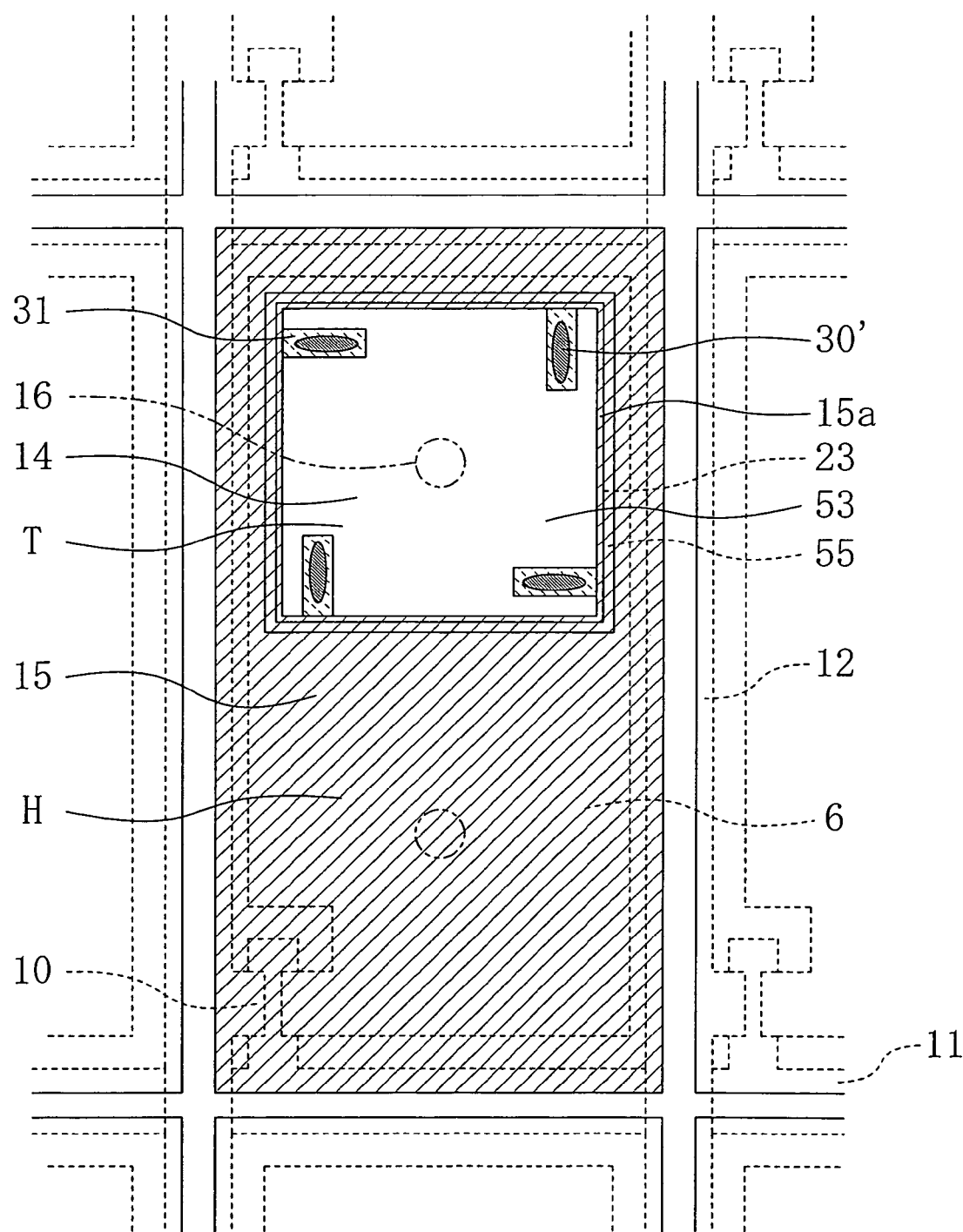
FIG. 9 is an enlarged sectional view illustrating still another example of Embodiment 2.

For example, as shown in FIG. 9, each of the light shields 31 may be so arranged that only a single side thereof contacts the edge of the connecting part 15a. In this case, only a single side of the light shield 31 is located a predetermined distance away from the edge of the connecting part 15a. This configuration also offers the same effect as described above.

Figure 10:
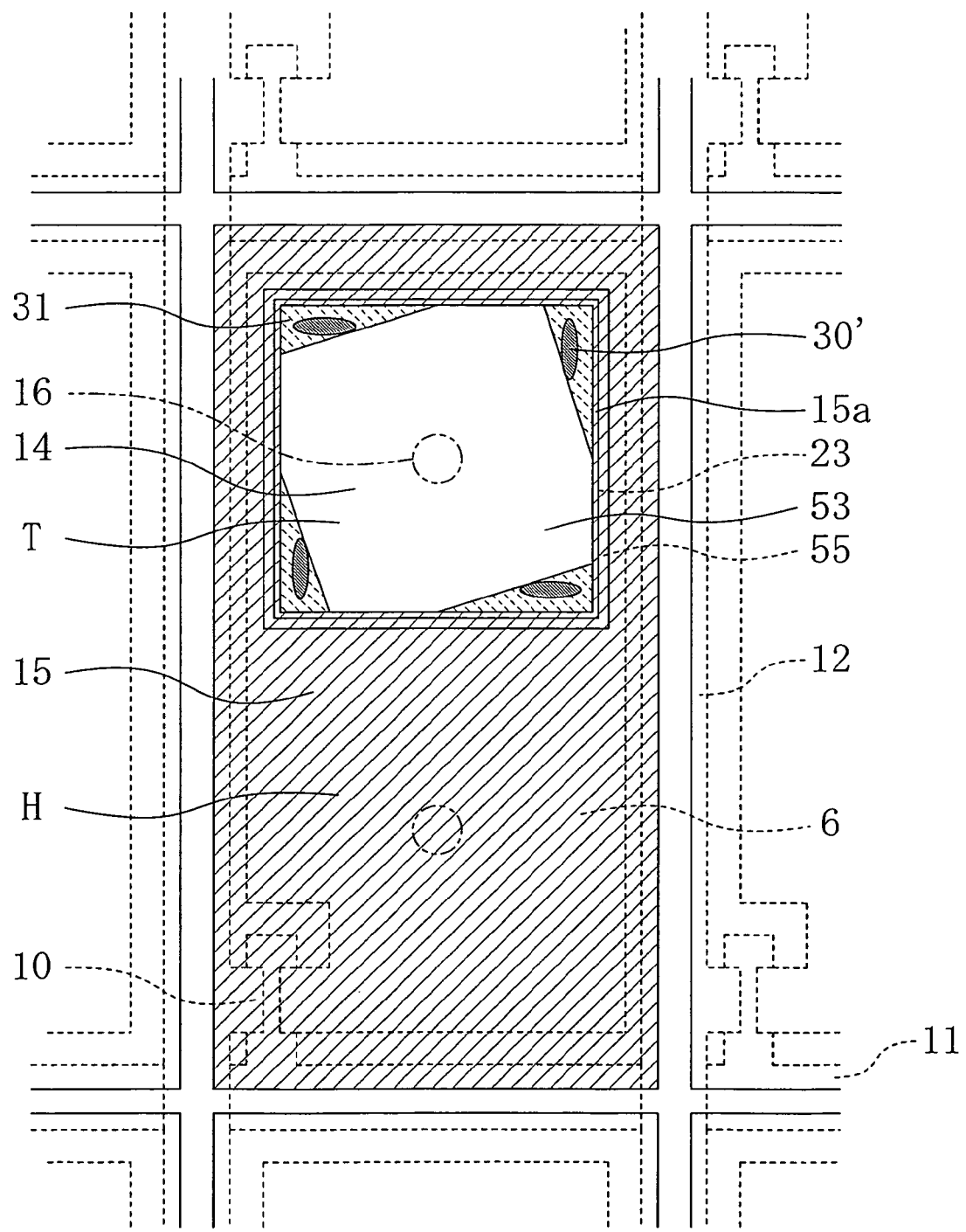
FIG. 10 is an enlarged sectional view illustrating still another example of Embodiment 2.

Or alternatively, the shape of the light shields 31 may be changed from rectangular to triangular as shown in FIG. 10. Two of the sides of the triangle forming the light shield 30 are aligned with the edge of the connecting part 15a when viewed in plan. This configuration offers the same effect as Embodiment 2 and enhances the appearance of the transmissive region T.

Then, regarding the light shields formed as shown in FIGS. 1 (Embodiment 1), 7, 10, 9 and 8 as patterns A, B, C, D and E, Table 1 shows the response time τ of each pattern.

TABLE 1

| | Pattern A | Pattern B | Pattern C | Pattern D | Pattern E |
|---|---|---|---|---|---|
| Response time τ (msec) | 685 | 385 | 405 | 375 | 365 |

The area ratio of the light shields 31 to the rectangular region 23 was 15% and the temperature of the measurement environment was 120° C. Table 1 indicates that pattern E showed the shortest response time of 365 msec.

Embodiment 3

FIGS. 12 to 16 show a liquid crystal display device according to Embodiment 3 of the present invention.

In the foregoing embodiments, the aperture 53 is in the form of a square when viewed in horizontal cross section. In this embodiment, however, the aperture 53 is in the form of an elongated rectangle when viewed in horizontal cross section. That is, the transmissive region T is shaped into an elongated rectangle when viewed in plan.

Figure 11:
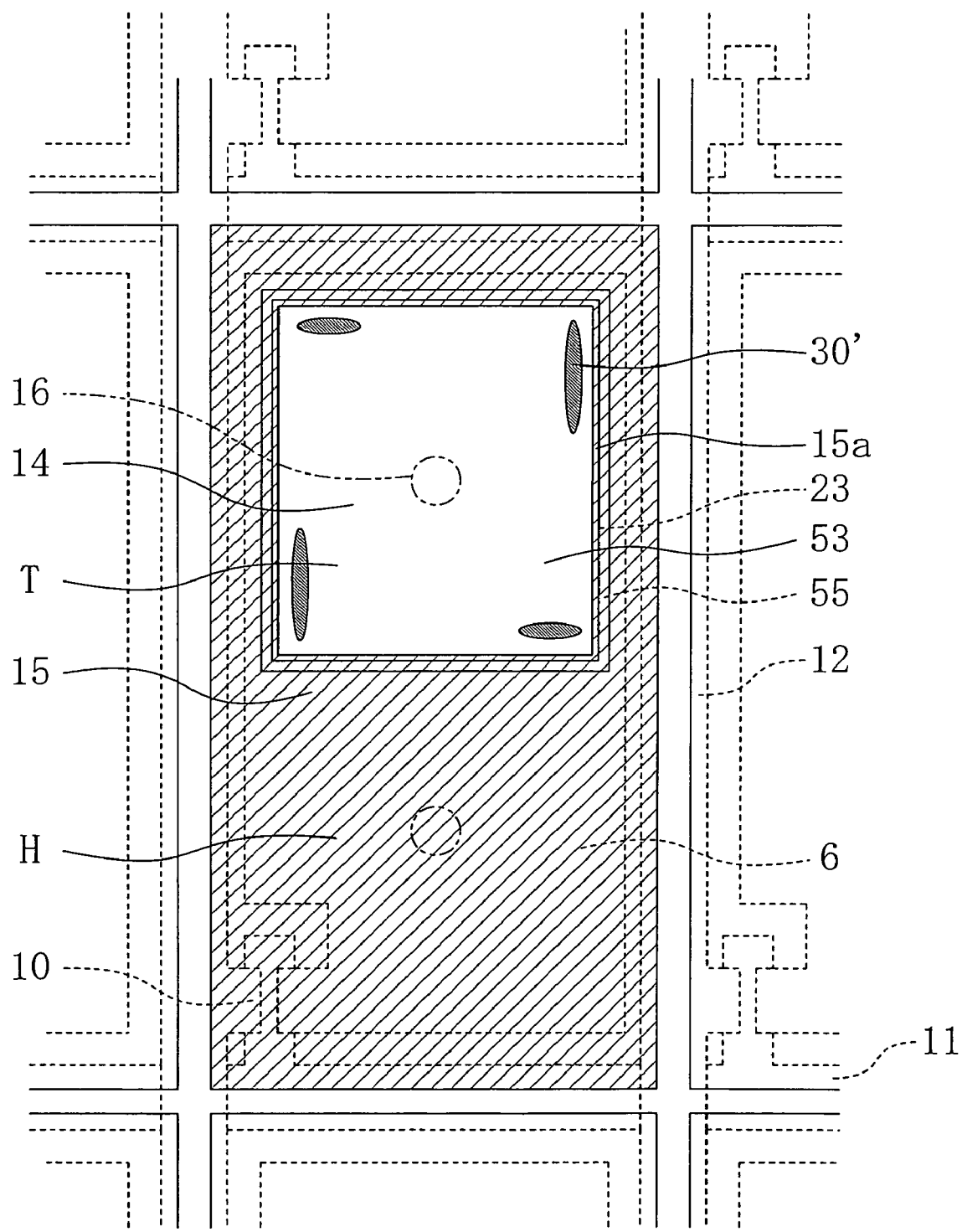
FIG. 11 is a plan view illustrating discontinuity regions in a transmissive region which is rectangular when viewed in plan.

As shown in FIG. 11, the elongated rectangular aperture 53 changes the shape of the discontinuity regions 30' in which the liquid crystal molecules 3 are oriented in a discontinuous manner. More specifically, two of the four discontinuity regions 30' generated along the long sides of the elongated rectangular aperture 53 are relatively elongated along the long sides of the aperture 53.

Accordingly, in this embodiment, the light shields 31 formed along the long sides of the aperture 53 are also elongated more than the light shields 31 formed along the short sides of the aperture 53 in accordance with the shape of the discontinuity regions 30'. In other words, two of the light shields 31 formed along the long sides of the aperture 53 are in the form of a relatively long rectangle, while the other two formed along the short sides are in the form of a relatively short rectangle. This allows shielding the discontinuity regions 30' from light with efficiency.

Figure 13:
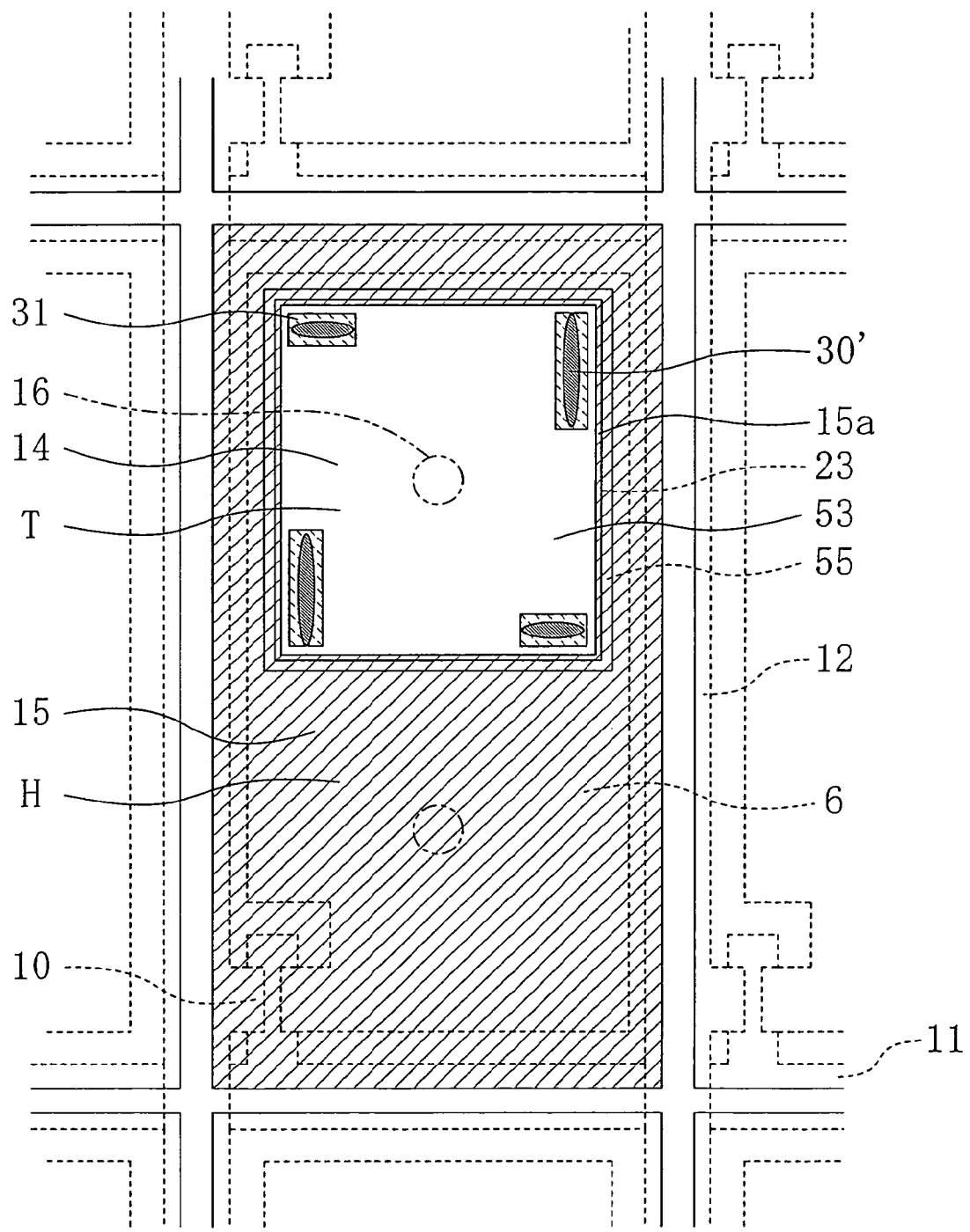
FIG. 13 is an enlarged sectional view illustrating another example of Embodiment 3.
Figure 14:
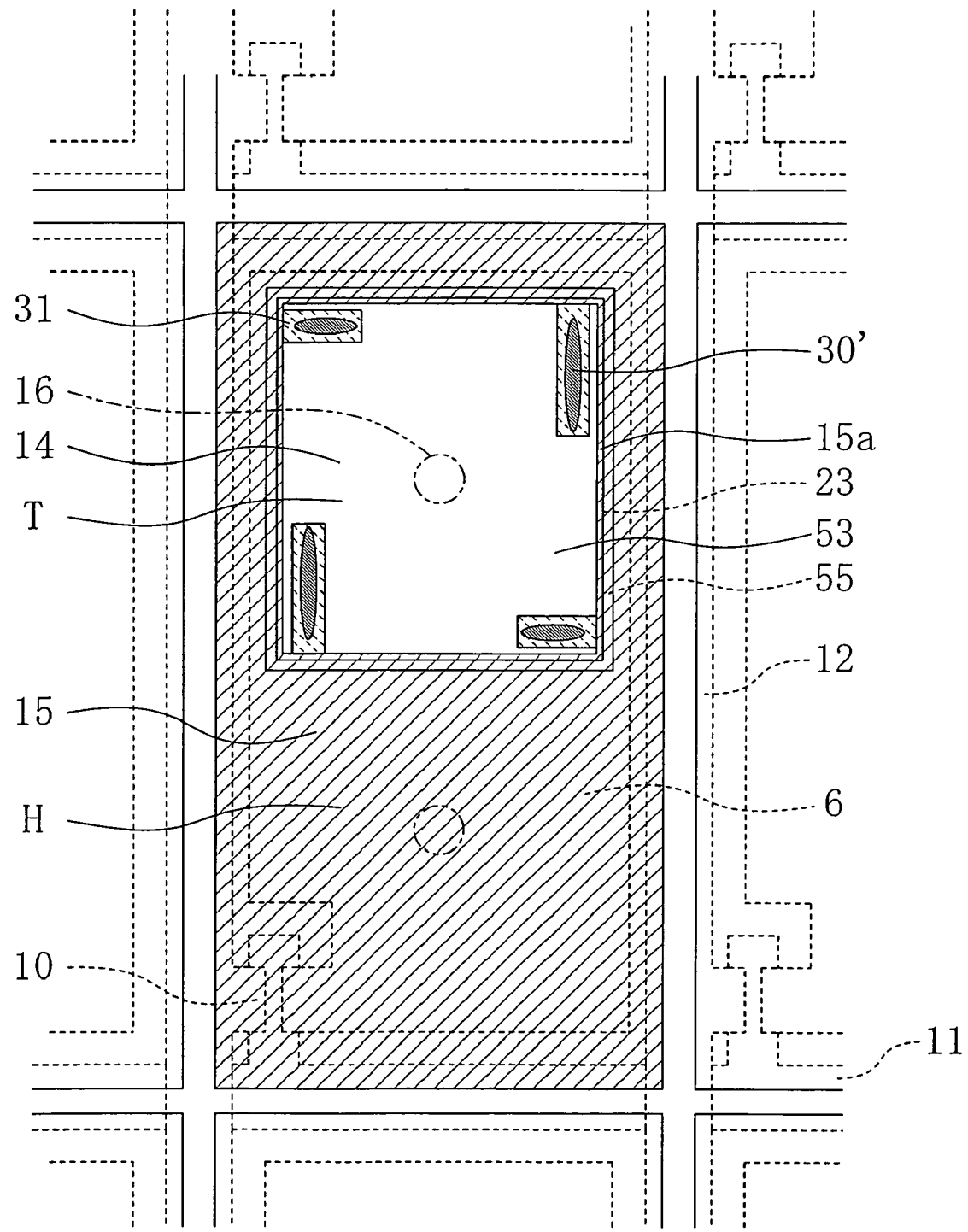
FIG. 14 is an enlarged sectional view illustrating still another example of Embodiment 3.

For example, the light shields 31 may be arranged a predetermined distance away from the connecting part 15a when viewed in plan as shown in FIG. 13. Further, as shown in FIG.

Figure 15:
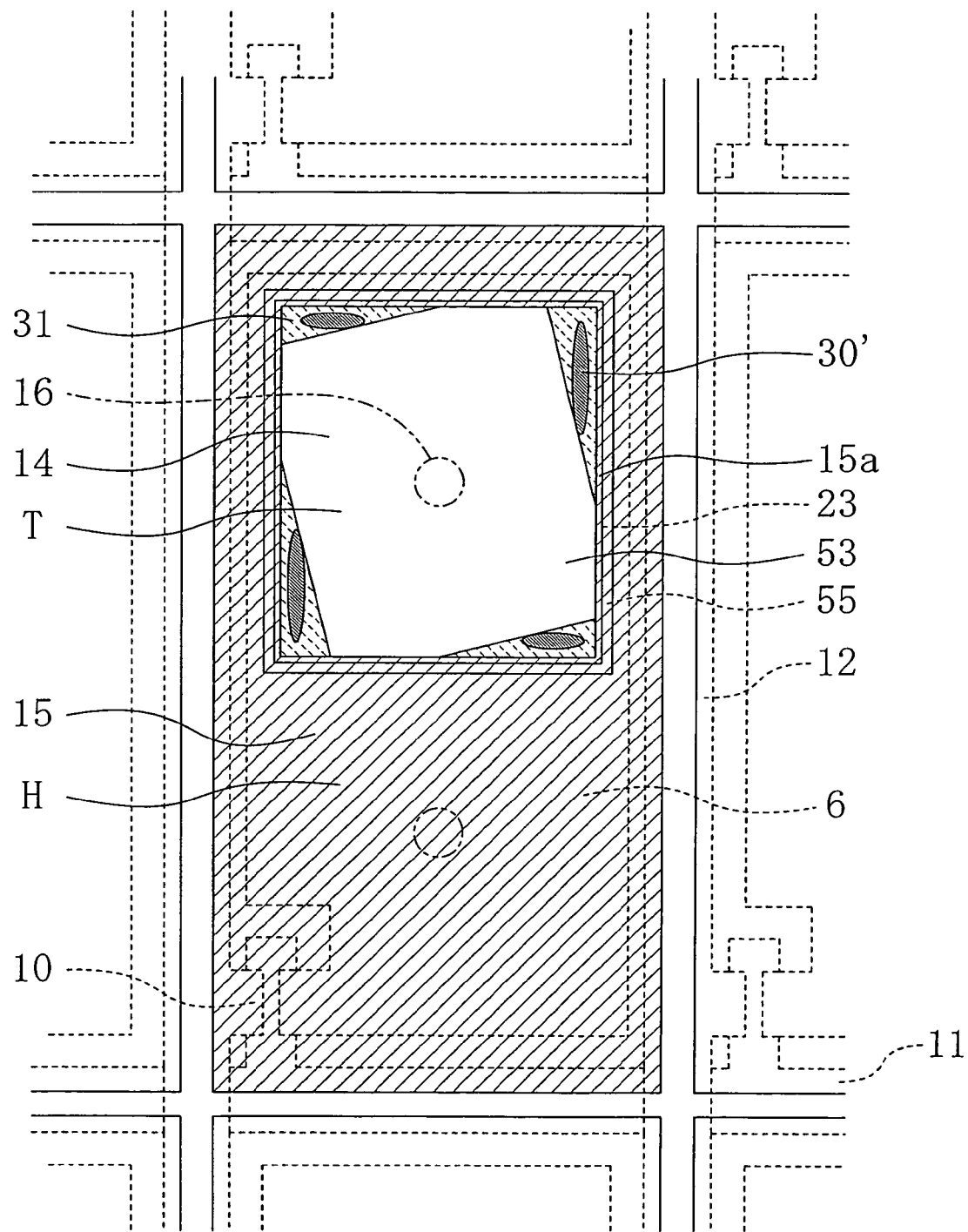
FIG. 15 is an enlarged sectional view illustrating still another example of Embodiment 3.
Figure 16:
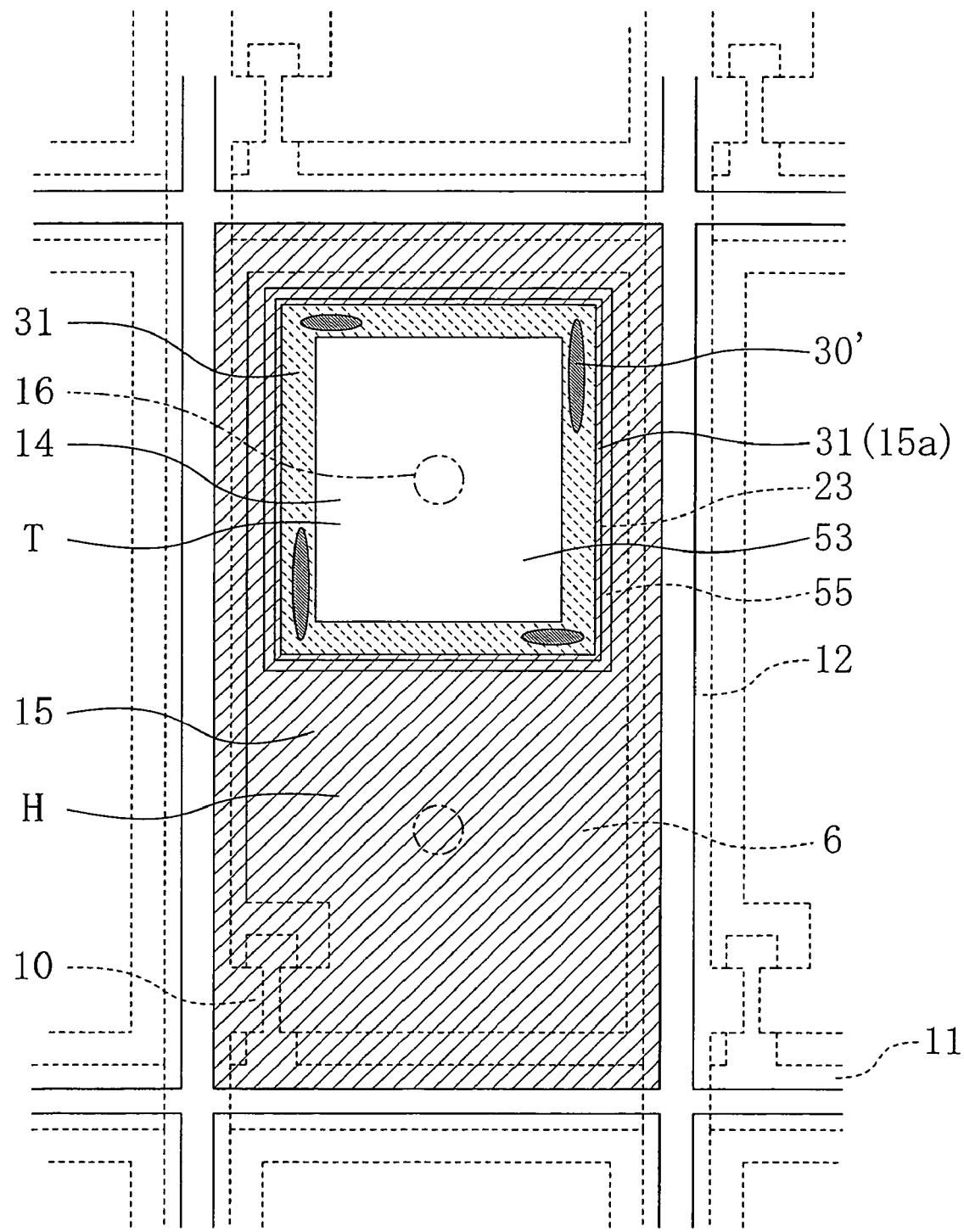
FIG. 16 is an enlarged sectional view illustrating still another example of Embodiment 3.

14, each of the light shields 31 may be so arranged that only a single side thereof is located a predetermined distance away from the edge of the connecting part 15a. Or alternatively, the shape of the light shields 31 may be triangular as shown in FIG. 15 or formed in one piece in the form of a rectangular ring as shown in FIG. 16.

Regarding the light shields formed as shown in FIGS. 16, 12, 15, 19 and 13 as patterns F, G, H, I and J, Table 2 shows the response time τ of each pattern.

TABLE 2

|  | Pattern F | Pattern G | Pattern H | Pattern I | Pattern J |
|---|---|---|---|---|---|
| Response time τ (msec) | 705 | 405 | 410 | 380 | 375 |

The elongated rectangular aperture 53 was 99 μm in longitudinal length and 83 μm in lateral length. The area ratio of the light shields 31 to the rectangular region 23 was 15% and the temperature of the measurement environment was −20° C. Table 2 indicates that pattern J showed the shortest response time of 375 msec.

Embodiment 4

Figure 17:
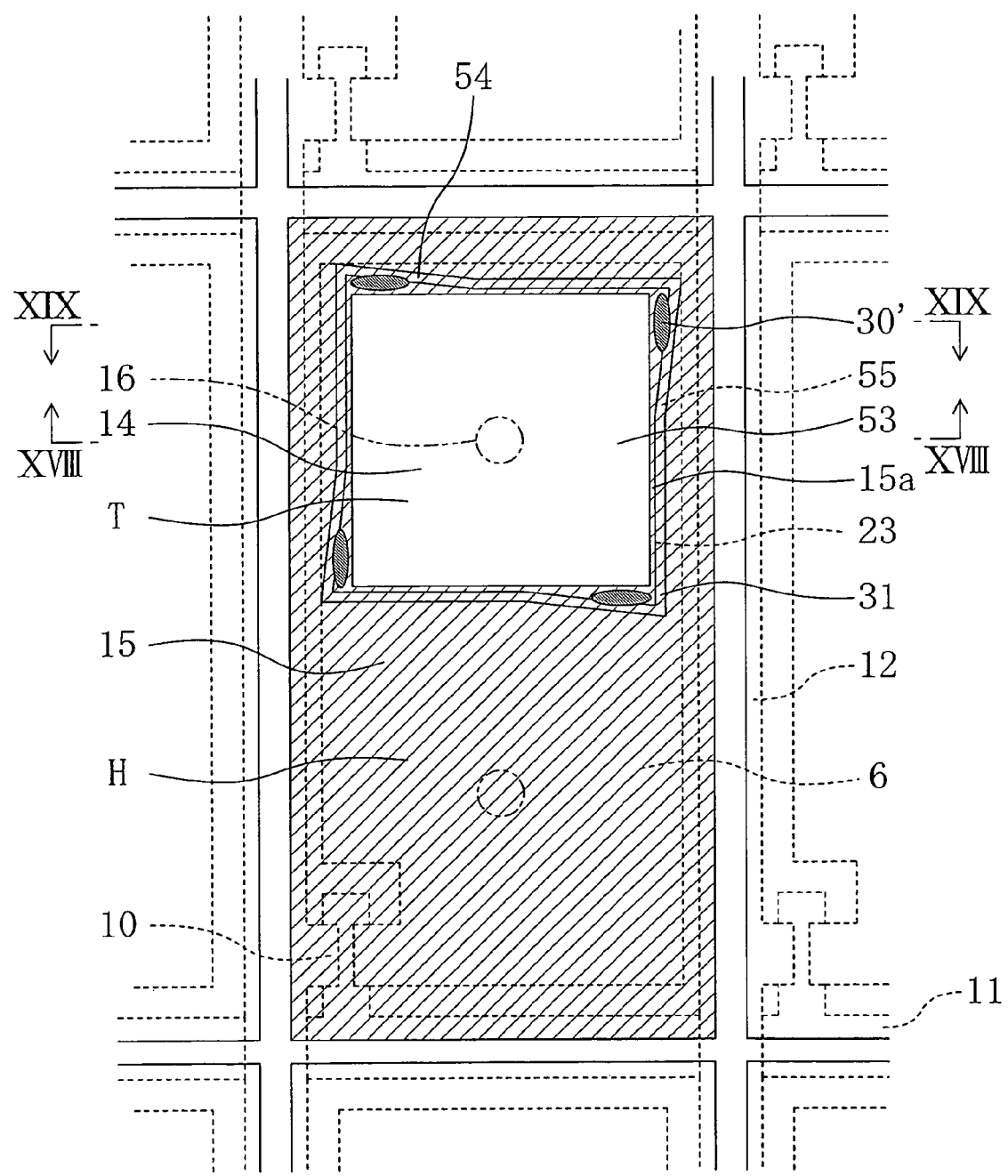
FIG. 17 is an enlarged plan view illustrating a liquid crystal display device of Embodiment 4.
Figure 18:
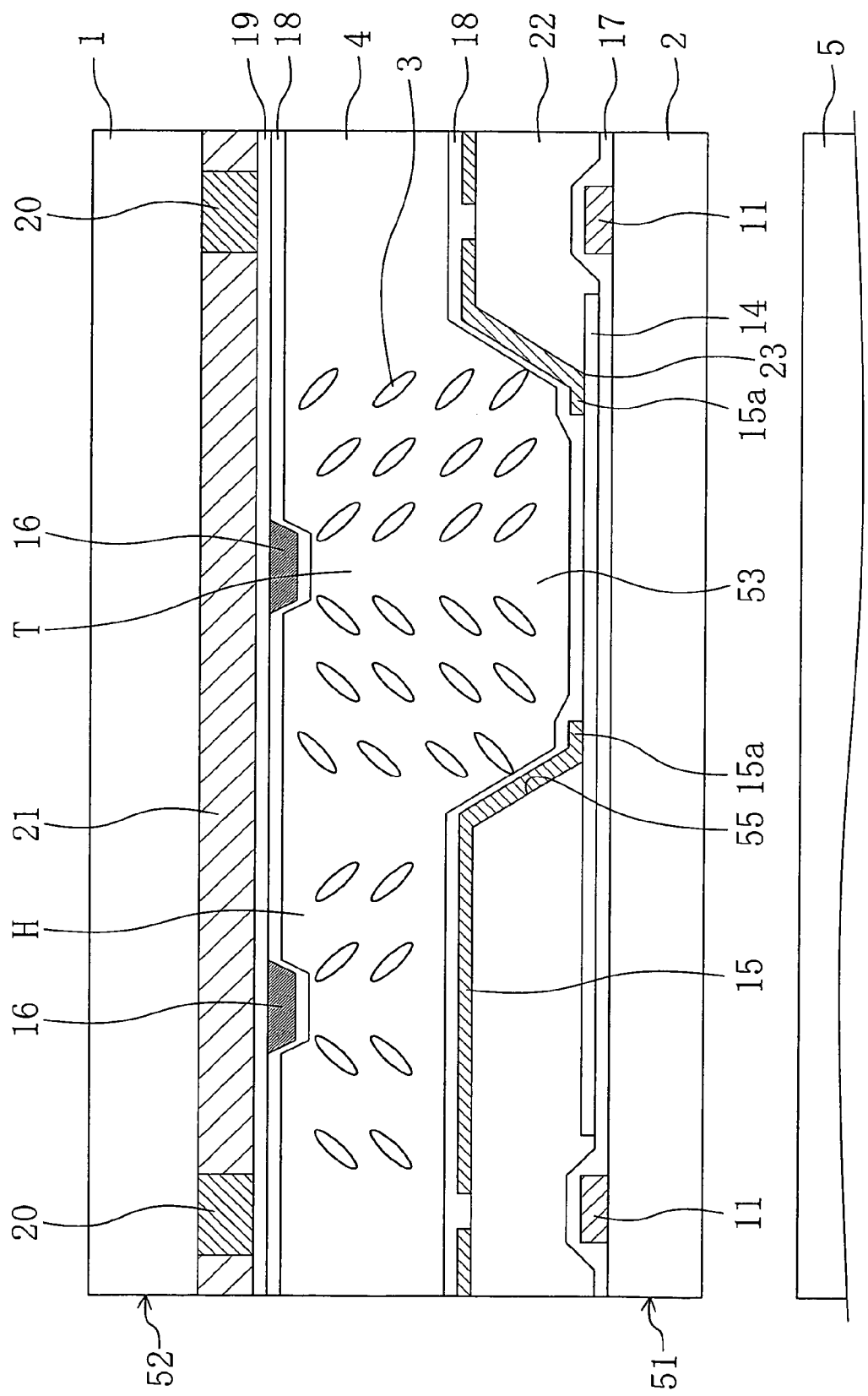
FIG. 18 is a sectional view taken along the line XVIII-XVIII shown in FIG. 17.
Figure 19:
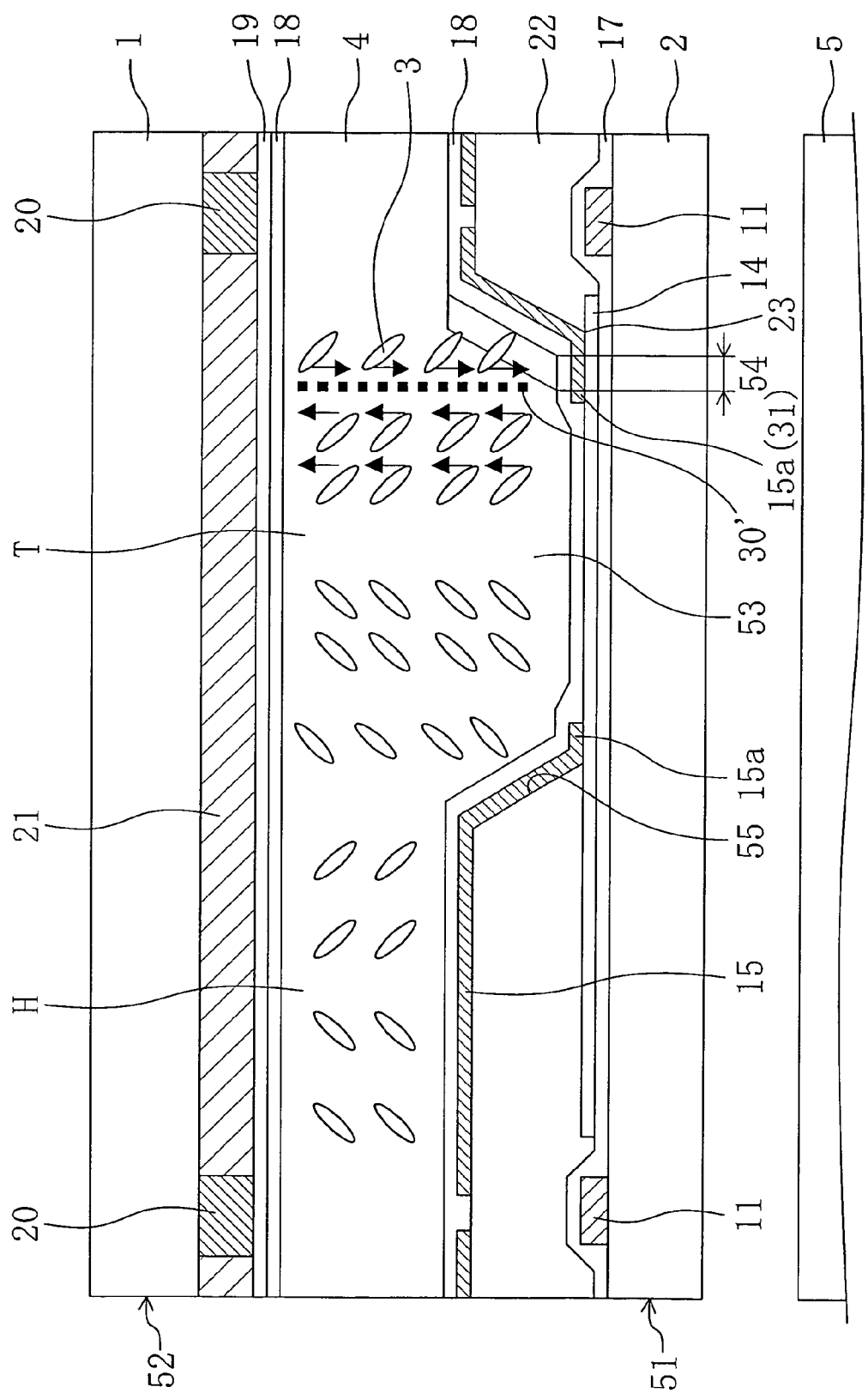
FIG. 19 is a sectional view taken along the line XIX-XIX shown in FIG. 17.

FIGS. 17 to 19 illustrate a liquid crystal display device according to Embodiment 4 of the present invention. FIG. 17 is an enlarged plan view of the liquid crystal display device and FIG. 18 is a sectional view taken along the line XVIII-XVIII shown in FIG. 17. FIG. 19 is also a sectional view taken along the line XIX-XIX shown in FIG. 17.

In this embodiment, the aperture 53 includes receding regions 54 formed by shifting part of each of the wall surfaces of the interlayer insulating film 22 outward as shown in FIGS. 17 and 19. Part of the sloping faces 55 corresponding to the receding regions 54 may be inclined at the same angle as the other part of the sloping faces 55 of the aperture 53, or at a different angle as described later.

As shown in FIGS. 17 and 18, when viewed in plan, some of the liquid crystal molecules 3 corresponding to lines passing through the center of the aperture 53 and parallel to the sides of the aperture 53 are oriented in a relatively less discontinuous manner. Therefore, it is unnecessary to form the receding regions 54 for such liquid crystal molecules 3. On the other hand, some of the liquid crystal molecules 3 at the corners of the aperture 53 are oriented in a particularly discontinuous manner. Therefore, in this embodiment, each of the sloping faces 55 of the aperture 53 is partially shifted outward as shown in FIG. 17. Thus, the discontinuity regions 30' where the liquid crystal orientation is discontinuous are shifted to the receding regions 54, respectively.

With this configuration, since the sloping faces 55 are partially shifted outward to provide the receding regions 54, parts of the connecting part 15a corresponding to the receding regions 54 extend in the shifting direction of the sloping faces 55. Therefore, the discontinuity regions 30' is shielded from light with the extending parts of the connecting part 15a as shown in FIG. 19. As a result, the discontinuity regions 30' are shielded from light without reducing the area of the transmissive region T. This allows an improvement in both the response speed and aperture ratio.

Figure 20:
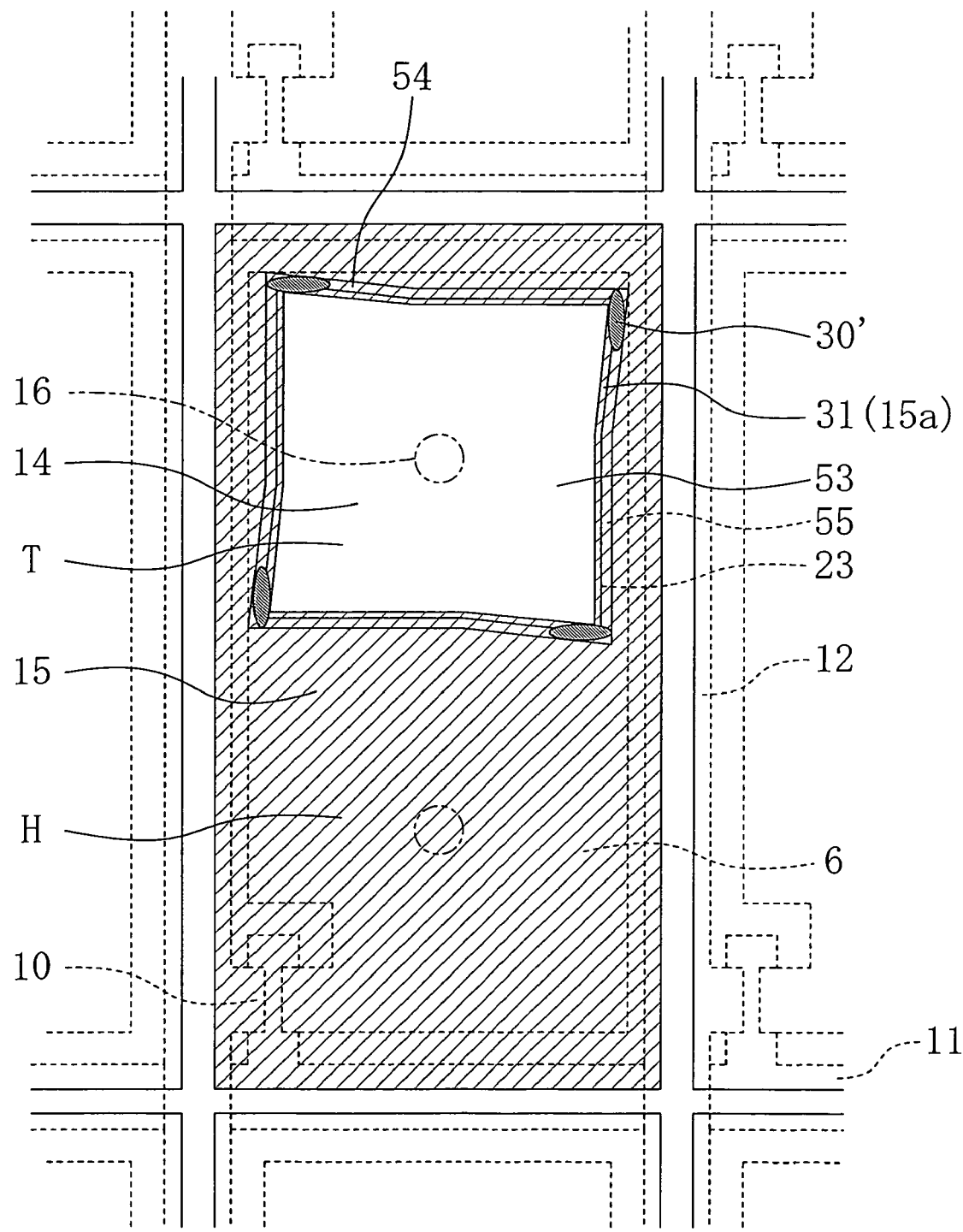
FIG. 20 is an enlarged sectional view illustrating another example of Embodiment 4.

Further, as shown in FIG. 20, parts of the connecting part 15a corresponding to the receding regions 54 may be shifted toward outside the aperture 53. This allows a further improvement in aperture ratio. Preferably, the angle of the sloping faces 55 at the receding regions 54 is reduced so that the sloping faces 55 are gently inclined. By so doing, the discontinuity regions 30' are shielded from light with the connecting part 15a and the sloping faces 55 at the receding regions 54.

Then, regarding the light shields shown in FIGS. 17 and 20 as patterns K and L, Table 3 shows the response time τ of each pattern.

TABLE 3

|  | Pattern K | Pattern L |
|---|---|---|
| Response time τ (msec) | 375 | 385 |
| Area ratio of light shield (%) | 0 | −8 |

The area ratio of the light shield of pattern K to the rectangular region 23 was 0% and that of the light shield of pattern L was −8%. The environment temperature during the measurement is −20° C. Table 3 indicates that the response time of pattern K is as short as 375 msec.

Embodiment 5

FIGS. 22 to 25 illustrate a liquid crystal display device according to Embodiment 5 of the present invention.

Figure 21:
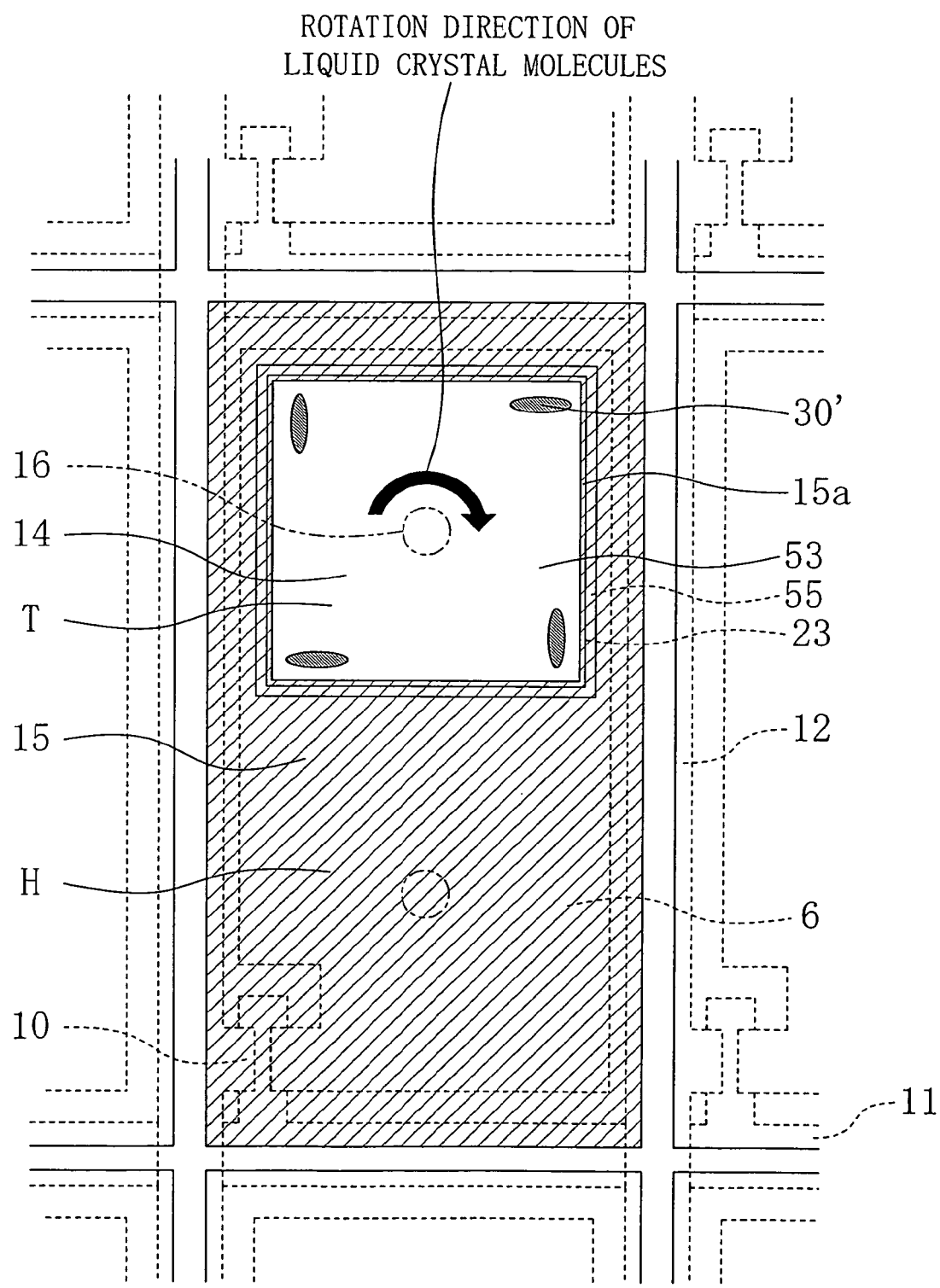
FIG. 21 is a plan view illustrating discontinuity regions generated when liquid crystal molecules rotate in the right-handed direction.

In the foregoing embodiments, a levorotatory chiral dopant is added to the liquid crystal layer 4. In this embodiment, however, a dextrorotatory chiral dopant is added thereto. As shown in FIG. 21, a change in rotation direction of the liquid crystal molecules makes a change in orientation of the discontinuity regions 30'.

Figure 22:
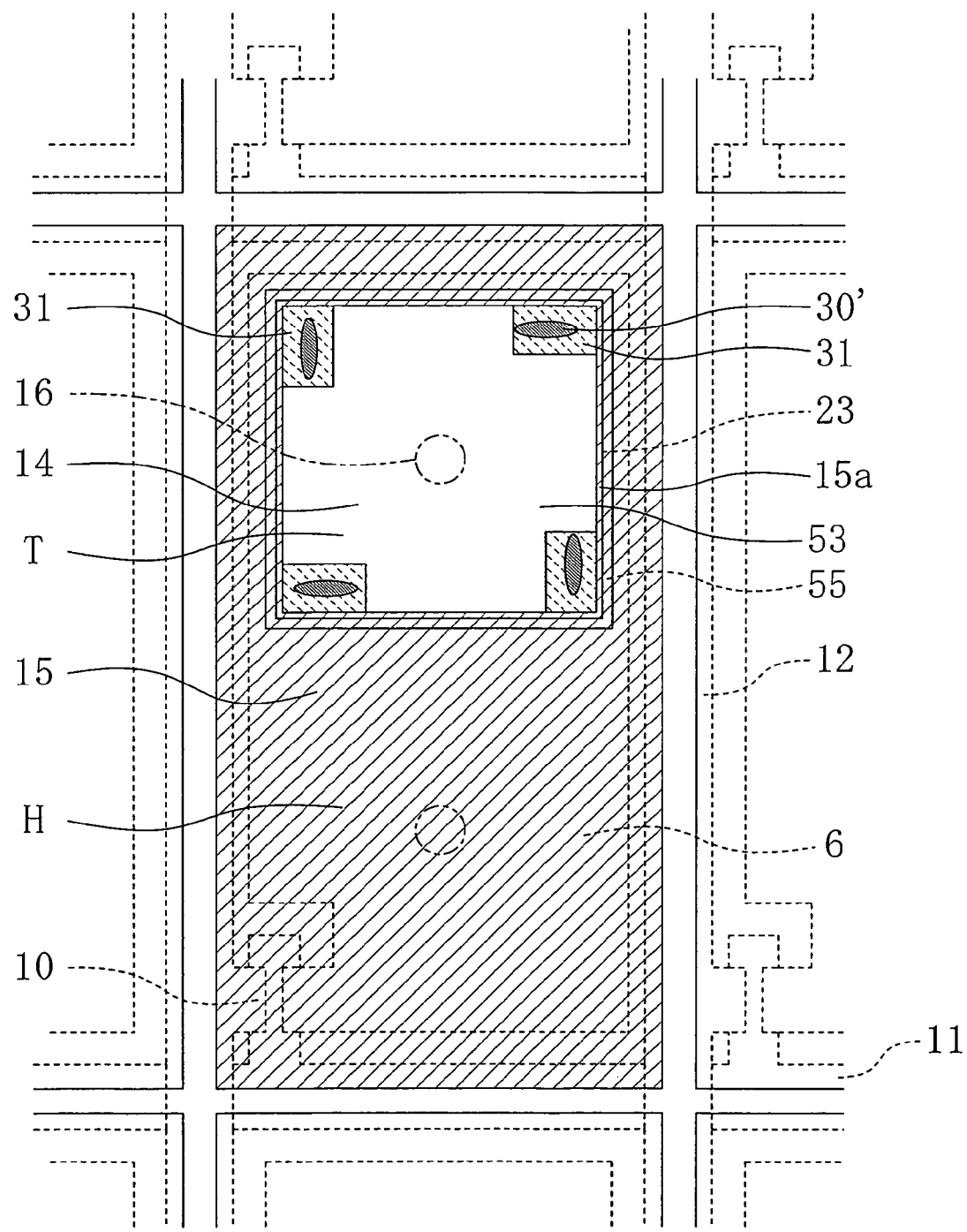
FIG. 22 is an enlarged plan view illustrating a liquid crystal display device of Embodiment 5.
Figure 23:
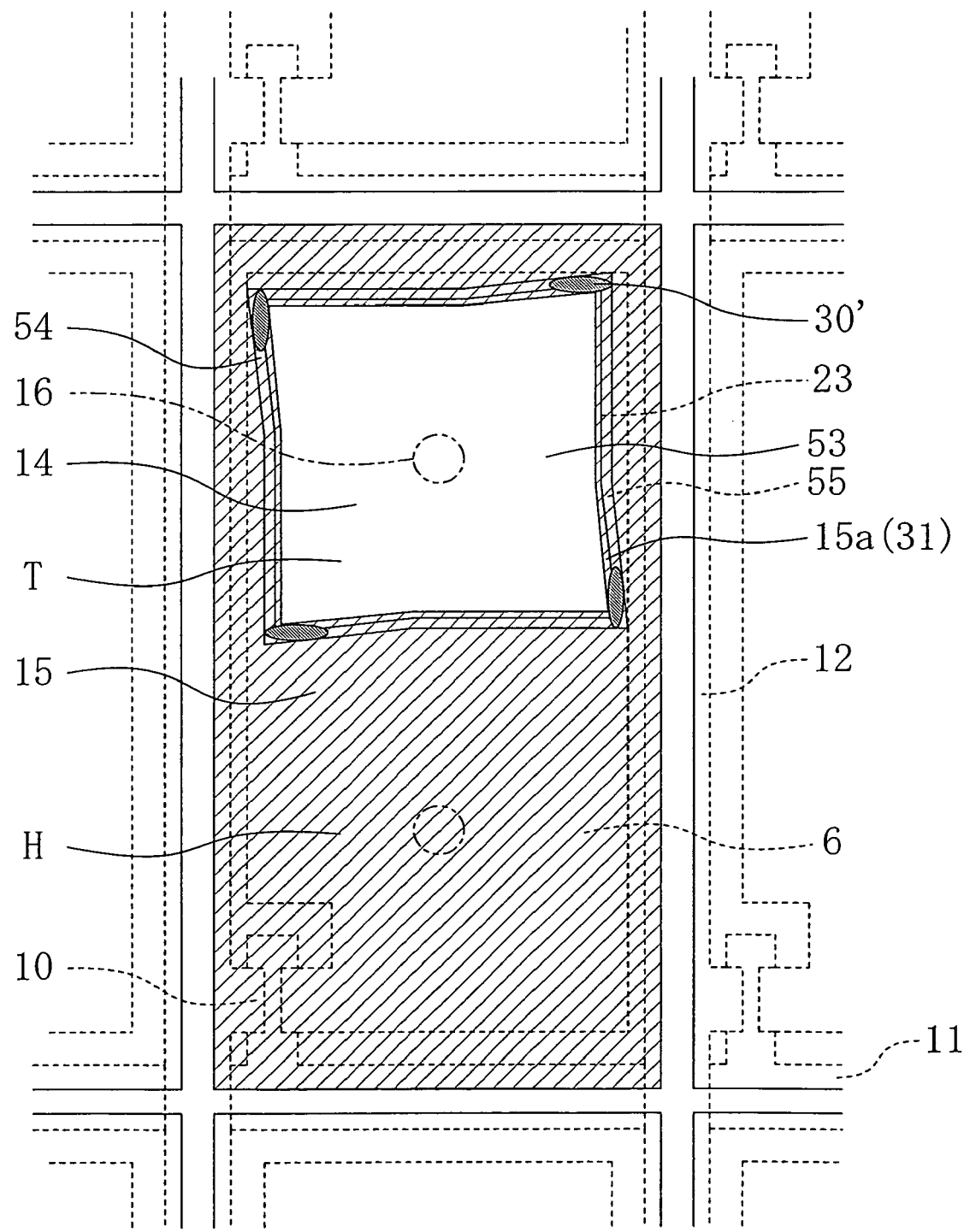
FIG. 23 is an enlarged sectional view illustrating another example of Embodiment 5.
Figure 24:
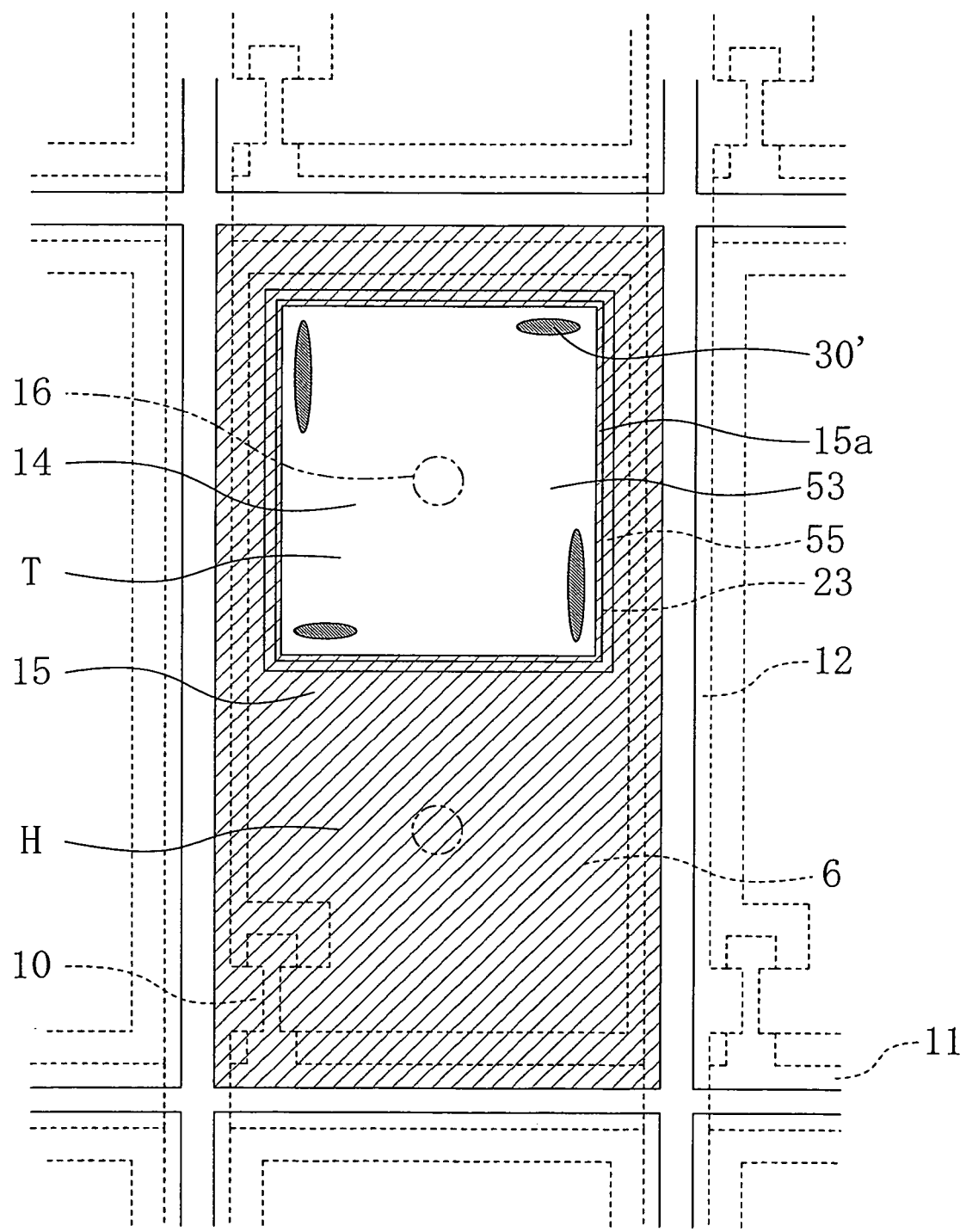
FIG. 24 is a plan view illustrating discontinuity regions generated when liquid crystal molecules rotate in the right-handed direction and the transmissive region has a rectangular planar shape.

Accordingly, in this embodiment, the orientation of the light shields 31 is also changed in accordance with the change in orientation of the discontinuity regions 30'. More specifically, as shown in FIG. 22, the elongated rectangular light shields 31 are preferably arranged at the corner regions of the aperture 53 in the same manner as in Embodiment 2. Or alternatively, the discontinuity regions 30' may be shielded from light by forming the receding regions 54 as shown in FIG. 23 in the same manner as in Embodiment 4.

Figure 25:
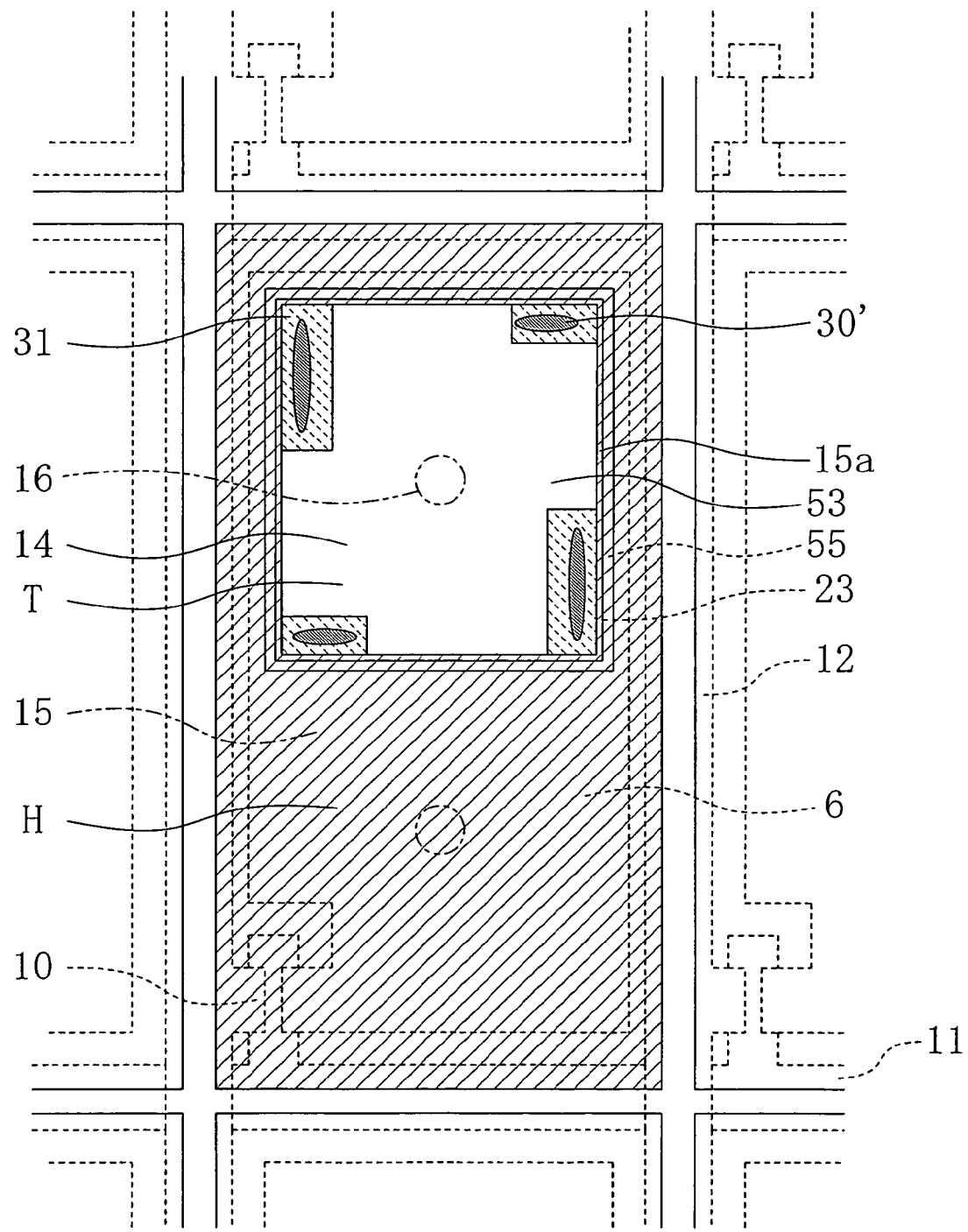
FIG. 25 is an enlarged sectional view illustrating still another example of Embodiment 5.

If the aperture 53 is in the form of an elongated rectangle when viewed in horizontal cross section, the discontinuity regions 30' generated along the long sides of the aperture 53 are also elongated along the long sides of the aperture 53. Therefore, in the same manner as in Embodiment 3, it is preferred that the light shields 31 for the discontinuity regions 30' elongated along the long sides of the aperture 53 are relatively elongated in the same direction as shown in FIG. 25.

Embodiment 6

Figure 26:
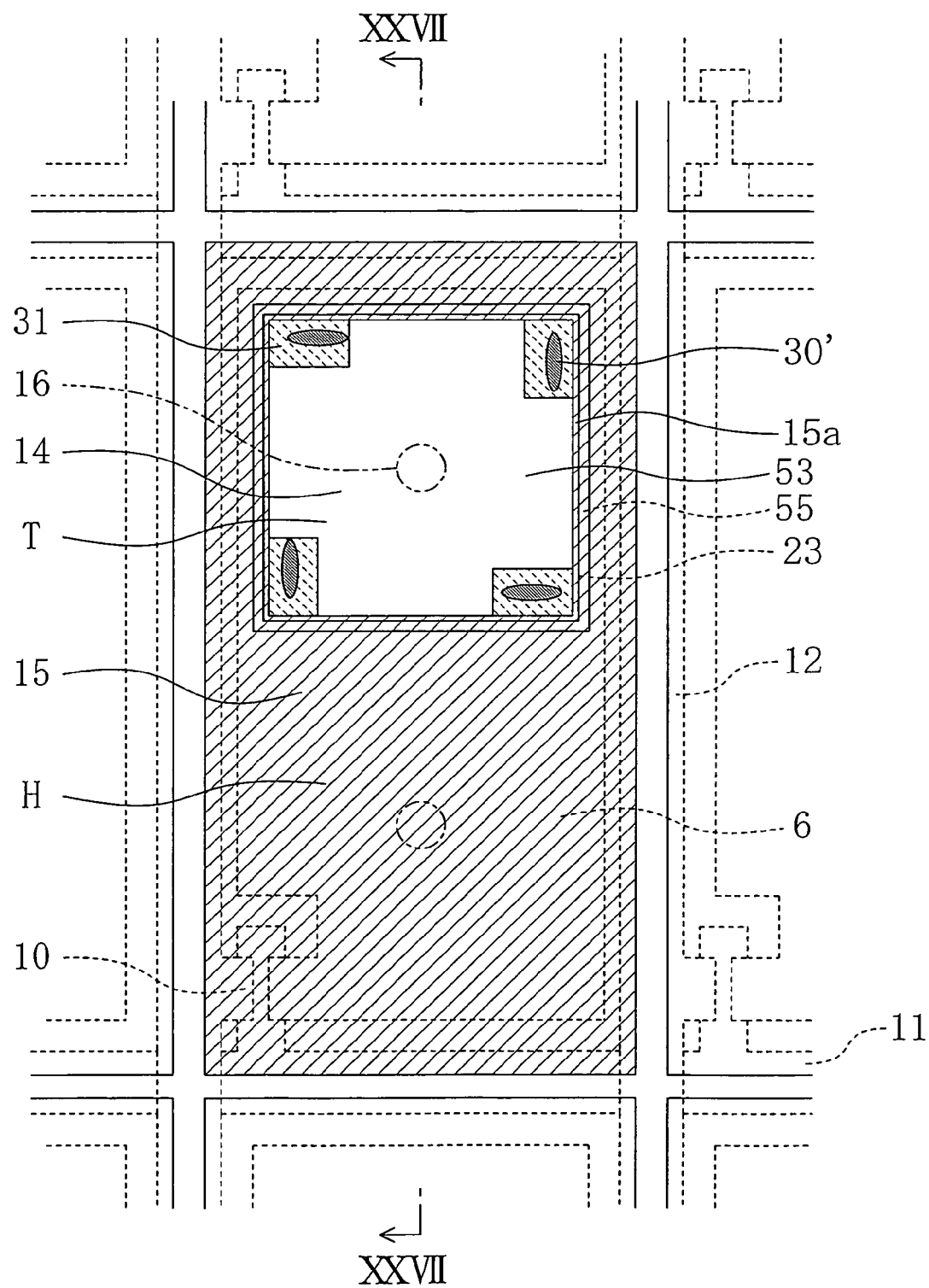
FIG. 26 is an enlarged plan view illustrating a liquid crystal display device of Embodiment 6.
Figure 27:
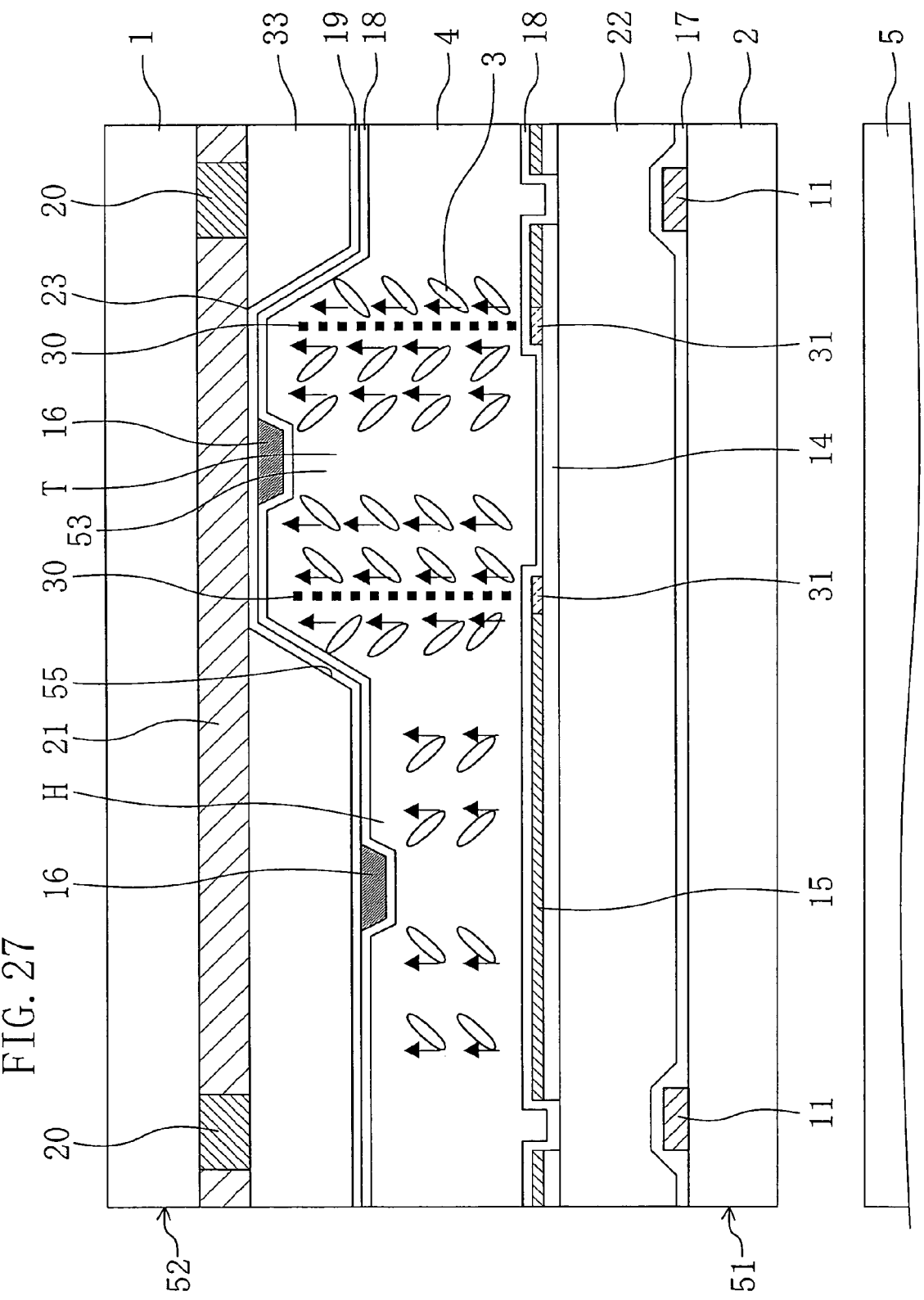
FIG. 27 is a sectional view taken along the line XXVII-XXVII shown in FIG. 26.

FIGS. 26 and 27 illustrate a liquid crystal display device according to Embodiment 6 of the present invention. FIG. 26 is an enlarged plan view of the liquid crystal display device and FIG. 27 is a sectional view taken along the line XXVII-XXVII shown in FIG. 26.

In Embodiments 1 to 5, the TFT substrate 51 is provided with the interlayer insulating film 22 including the aperture 53. In this embodiment, the counter substrate 52 is provided with an interlayer insulating film 33 including the aperture 53.

More specifically, the TFT substrate 51 includes a glass substrate 2 on which TFTs and wires 11 are formed by patterning and a protective insulating film 17 formed thereon. An interlayer insulating film 22 is stacked on the protective insulating film 17 and its surface is planarized. A second transparent electrode 14 which functions as a pixel electrode is formed on the surface of the interlayer insulating film 22 and a patterned reflective electrode 15 is formed on the second transparent electrode 14. Further, a vertical alignment film 18 is formed thereon to cover the reflective electrode 15 and the second transparent electrode 14.

On the other hand, the counter substrate 52 includes a glass substrate 1 on which a color layer 21 and a black matrix 20 are formed by patterning. Further, a first transparent electrode 19 which functions as a common electrode (counter electrode) and an interlayer insulating film 33 are formed thereon. The interlayer insulating film 33 is provided with an aperture 53 which is rectangular when viewed in horizontal cross section and opened toward the TFT substrate 51. A transmissive region T is provided within the aperture 53. Further, a reflective region H is provided around the transmissive region T.

Further, rivets 16 are formed on parts of the first transparent electrode 19 corresponding to the transmissive region T and the reflective region H, respectively, and a vertical alignment film 18 is formed to cover the rivets 16. This configuration allows the liquid crystal molecules in the liquid crystal layer 4 to be oriented in an axially symmetric manner when a voltage is applied. At this time, in the same manner as in Embodiments 1 to 5, discontinuity regions 30' are generated in portions of the liquid crystal layer 4 above the four corner regions of the aperture 53 which is rectangular when viewed in plan.

Therefore, the light shields 31 are provided for the TFT substrate 51 to prevent light from passing through the discontinuity regions 30'. The light shields 31 are formed of part of the reflective electrode 15 extending toward the center of the aperture 53.

Thus, in this embodiment, the discontinuity regions 30' are shielded from light with the light shields 31 in the same manner as in Embodiments 1 to 5. Therefore, the response time for transmissive display τ is reduced to 400 msec (−20° C.), thereby improving the response speed for display with efficiency. Further, the light shields 31 are easily formed by extending the reflective electrode 15.

Embodiment 7

Figure 29:
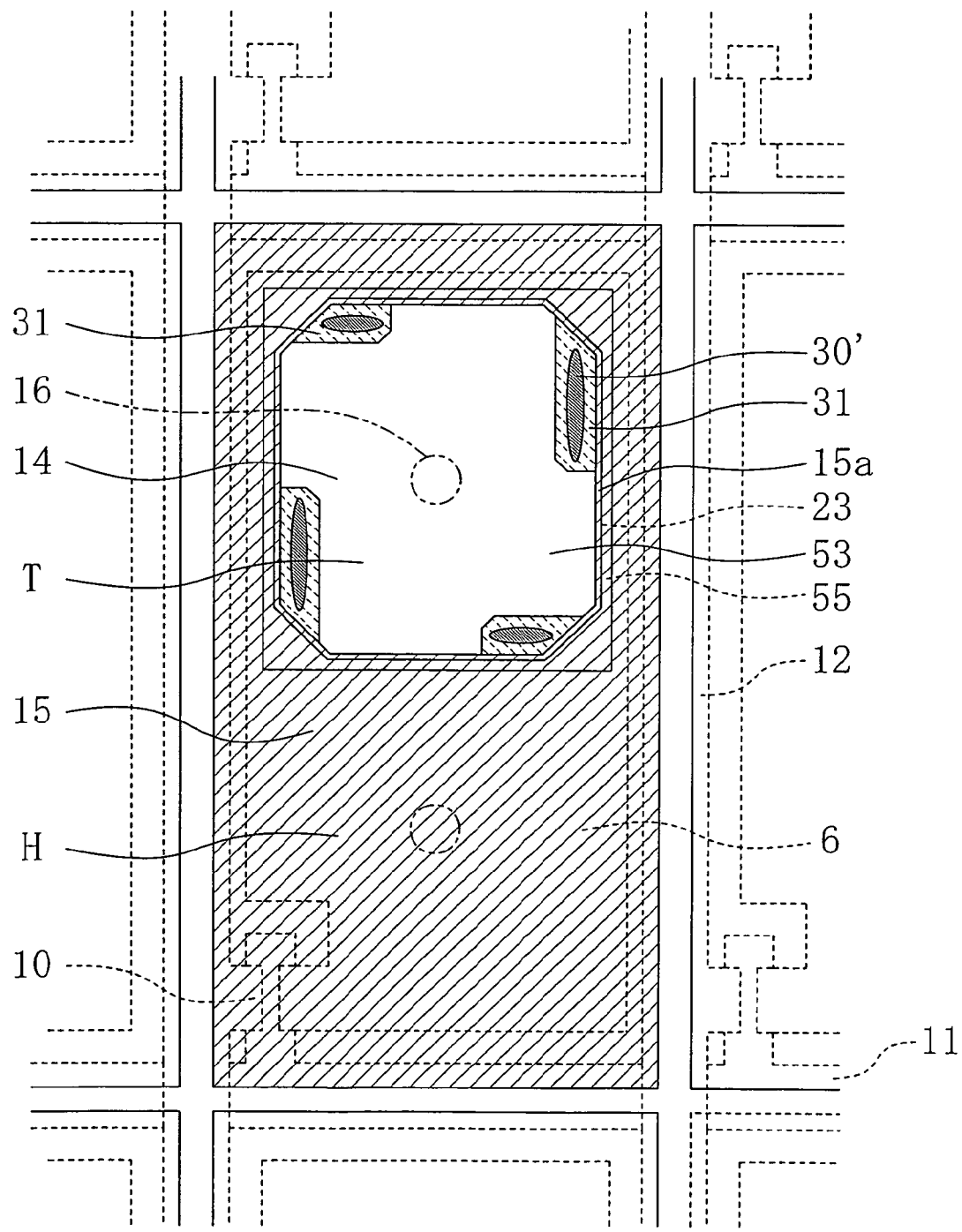
FIG. 29 is an enlarged plan view illustrating a liquid crystal display device of Embodiment 7.
Figure 30:
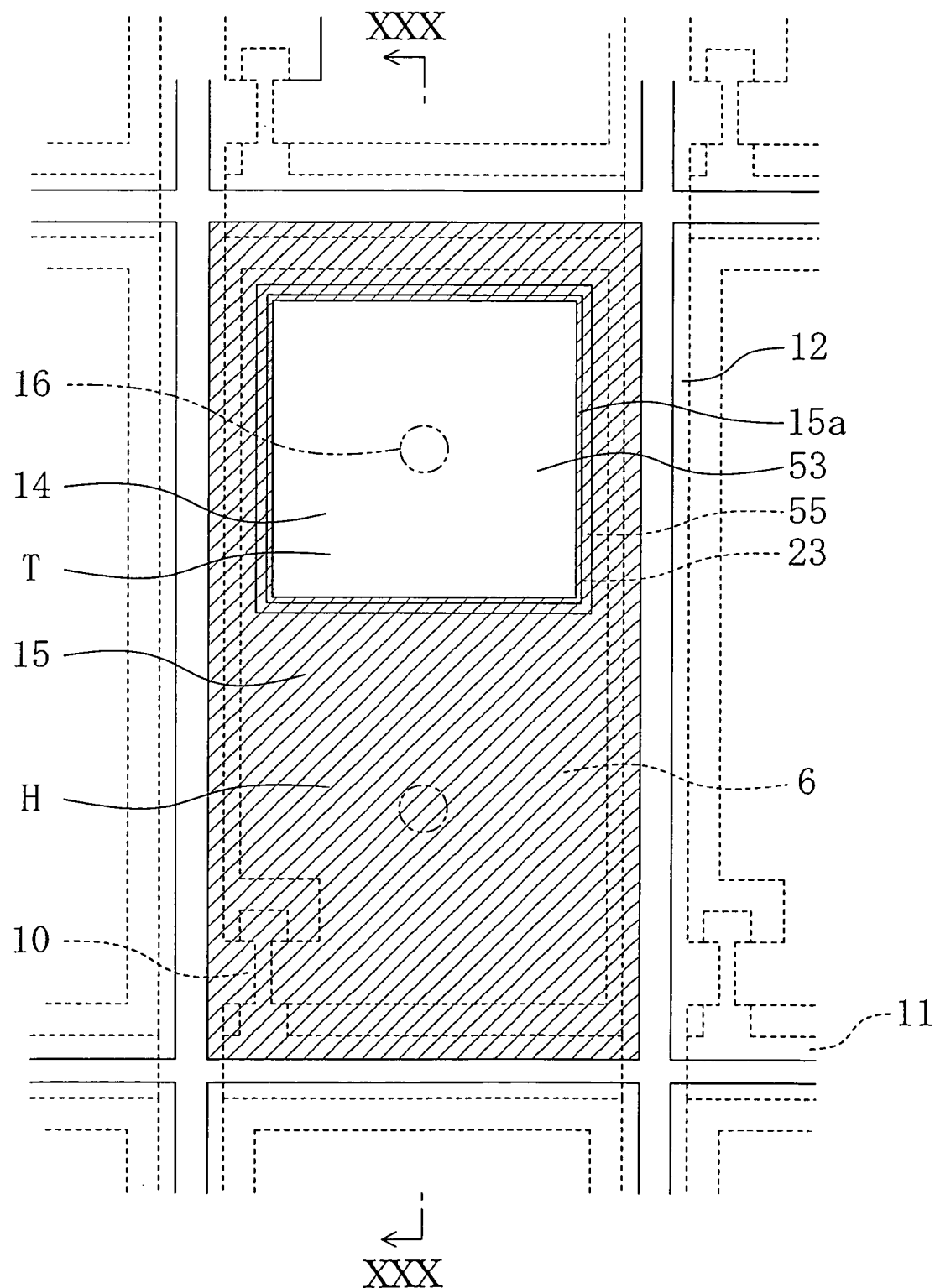
FIG. 30 is an enlarged plan view illustrating a conventional liquid crystal display device when no voltage is applied.
Figure 31:
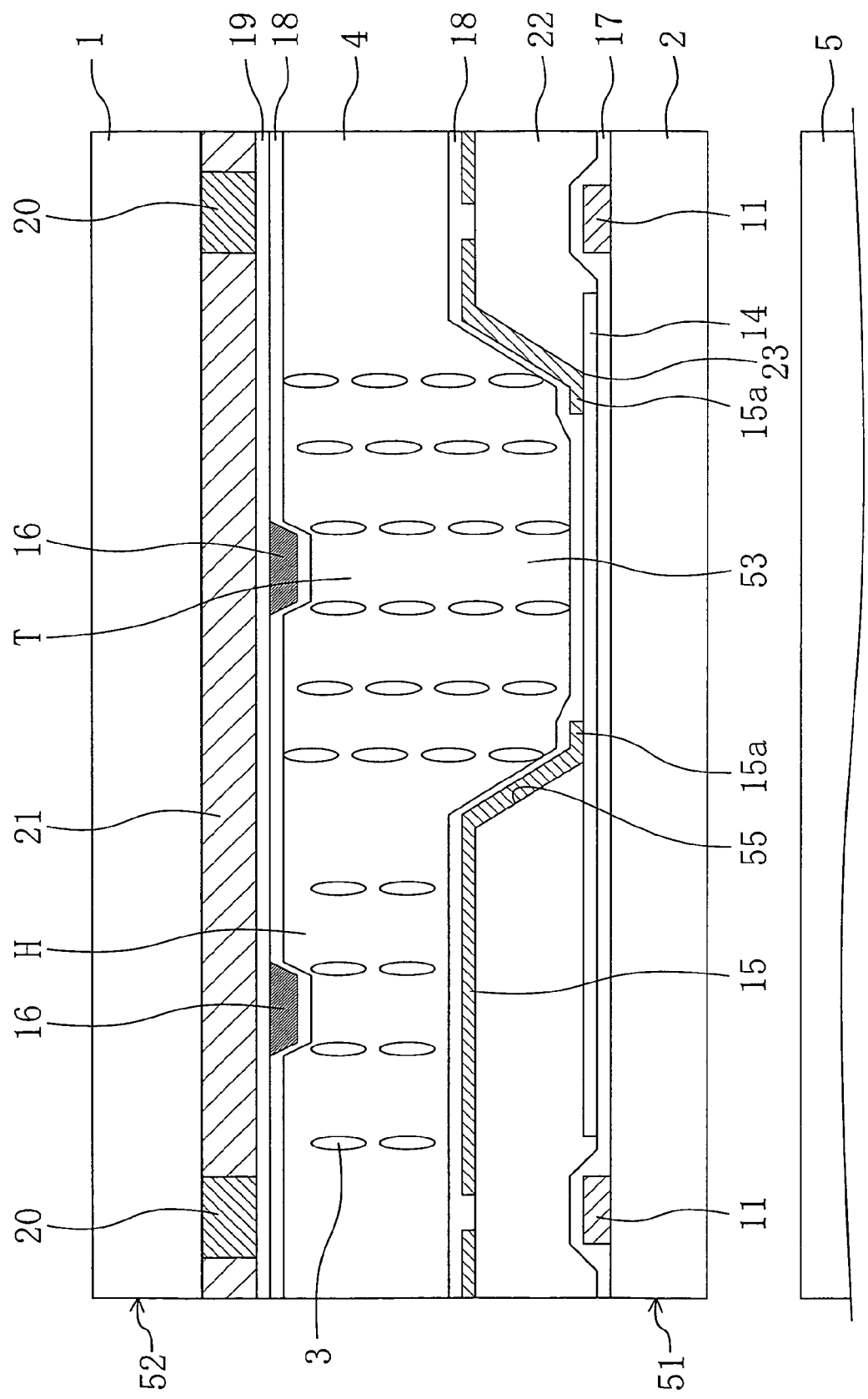
FIG. 31 is a sectional view taken along the line XXX-XXX shown in FIG. 29.
Figure 32:
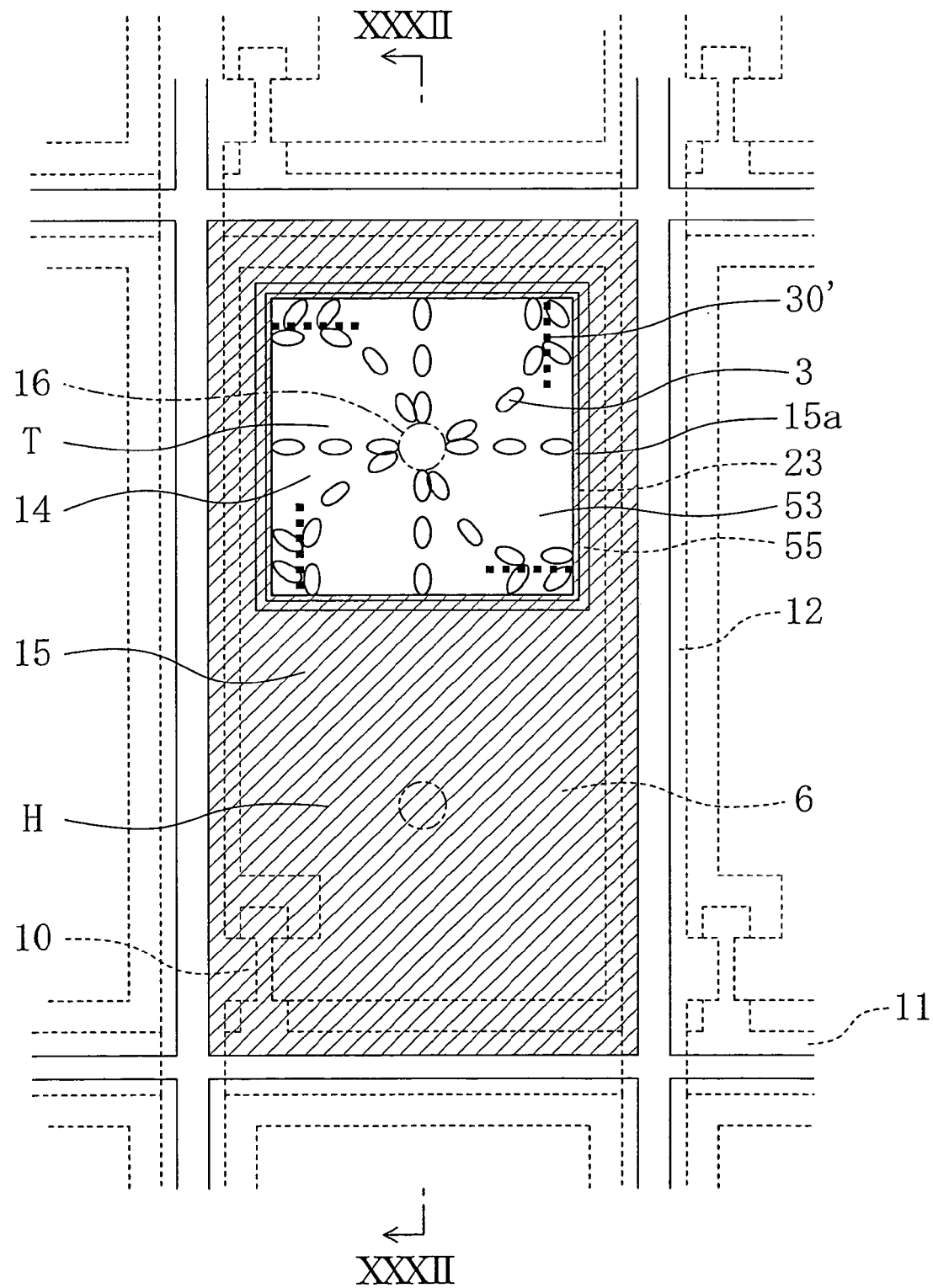
FIG. 32 is an enlarged plan view illustrating the conventional liquid crystal display device when a voltage is applied.
Figure 33:
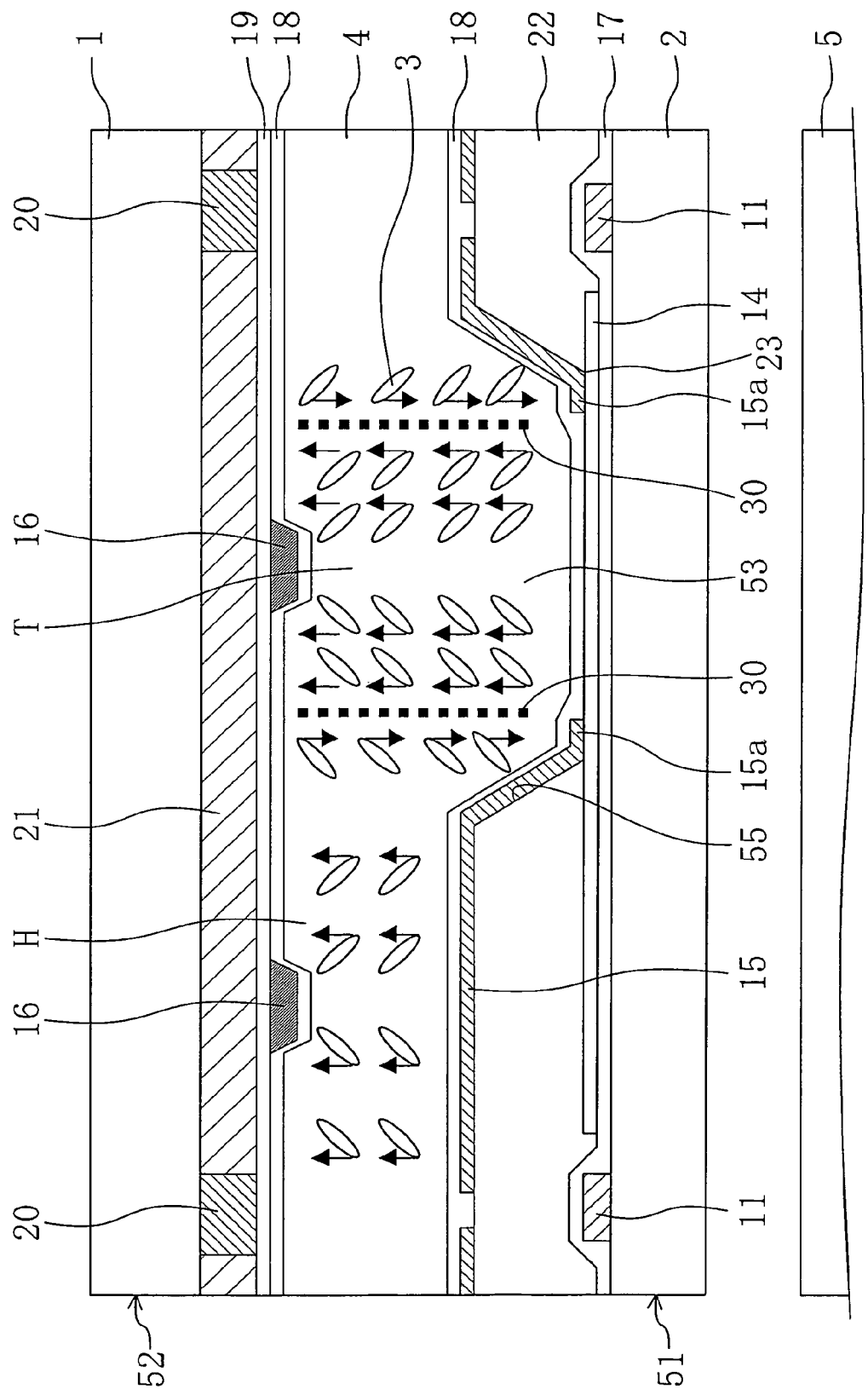
FIG. 33 is a sectional view taken along the line XXXII-XXXII shown in FIG. 31.
Figure 35:
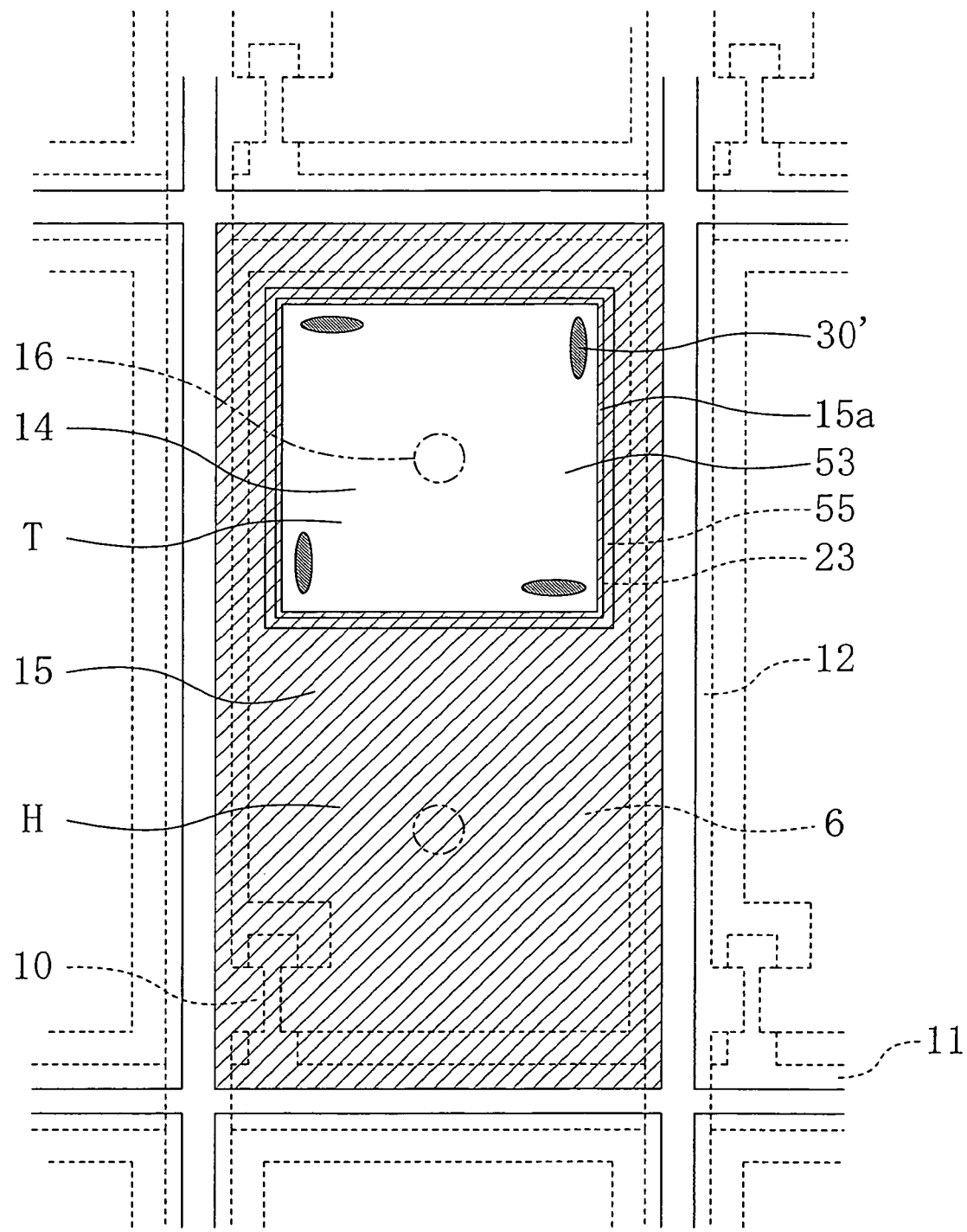
FIG. 35 is an enlarged plan view illustrating discontinuity regions.
Figure 36:
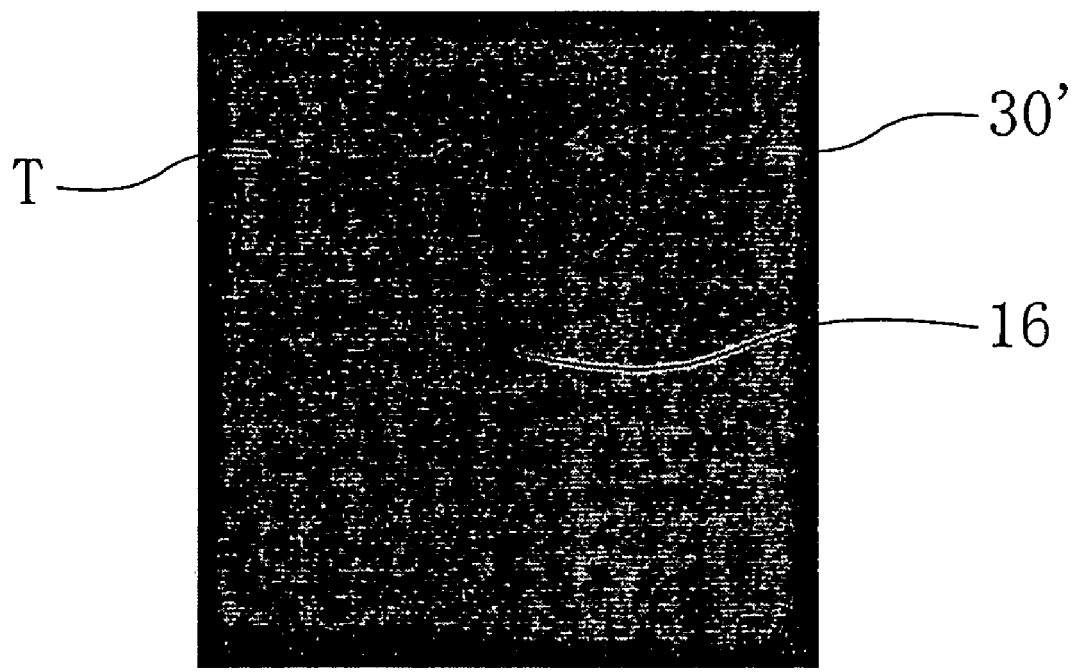
FIG. 36 is an enlarged photograph of a transmissive region illustrating the discontinuity regions.

FIG. 29 illustrates a liquid crystal display device of Embodiment 7 of the present invention.

In the same manner as in Embodiment 3, the aperture 53 of this embodiment is in the form of an elongated rectangle when viewed in horizontal cross section. However, this embodiment differs from Embodiment 3 in that the aperture 53 is so shaped that the four corners thereof are filled.

More specifically, the four corners of the rectangular region 23 of the aperture 53 are filled such that the aperture 53 is shaped into an octagon in a strict sense. Such a shape is included in the scope of the term "rectangular" mentioned in the present invention. That is, the term "rectangular" includes substantially rectangular shapes, e.g., a rectangle, a rectangle with the four corners filled and a rectangle with the four corners rounded.

Figure 12:
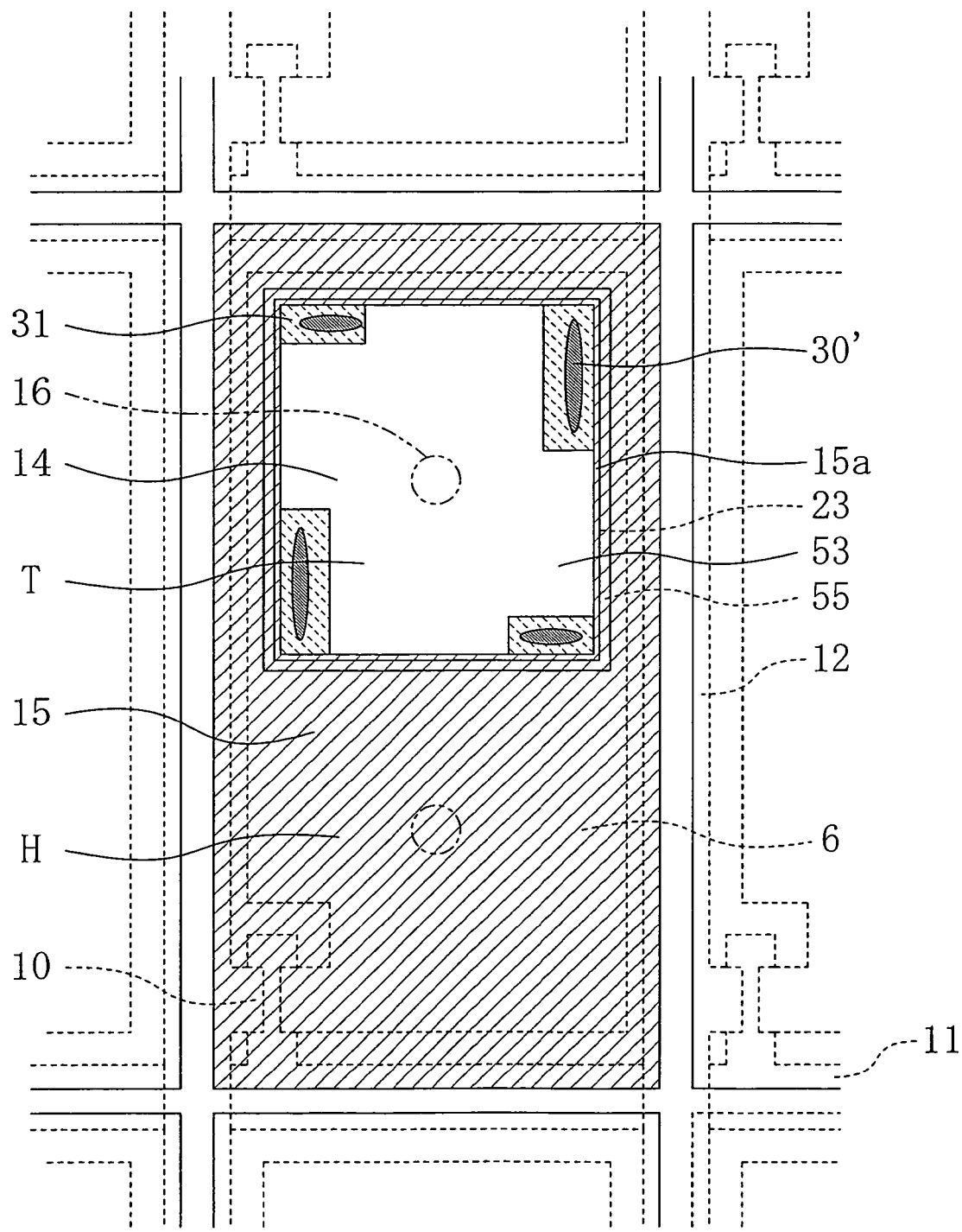
FIG. 12 is an enlarged plan view illustrating a liquid crystal display device of Embodiment 3.

Also in this embodiment, in the same manner as in Embodiment 3 shown in FIG. 12, some of the liquid crystal molecules 3 at certain regions of the rectangular aperture 53 are oriented in a discontinuous manner to generate discontinuity regions 30'. The light shields 31 are provided for the discontinuity regions 30'. The light shields 31 may be made of electrode material which is extended toward the center of the transmissive region T from the connecting part 15a of the reflective electrode 15. The electrode material may be aluminum, for example.

The rectangular region 23 is in the form of an elongated rectangle. Therefore, the discontinuity regions 30' generated along the long sides of the elongated rectangular region 23 are elongated more than those formed along the short sides. Accordingly, the light shields 31 provided along the long sides of the rectangular region 23 are formed relatively long, while those formed along the short sides of the rectangular region 23 are formed relatively short.

In the same manner as in Embodiment 3, this configuration allows shielding the discontinuity regions 30' from light with the light shields 31, thereby improving the response speed for display by the transmissive region T with efficiency.

The light shields 31 may be configured as described above in the foregoing embodiments. For example, the light shields 31 may be made of other materials than the electrode material for forming the connecting part 15a of the reflective electrode 15. For example, as described in the foregoing embodiments, the light shields 31 may be made of material for the black matrix or material for wirings formed on the TFT substrate 51. As described in Embodiment 4, the light shields 31 may also be provided by forming receding regions in the interlayer insulating film 22.

Thus, as described above, the present invention is useful for vertical alignment liquid crystal display device including transmissive regions. In particular, the invention is suitable for efficiently improving response speed for display by the transmissive regions with a simple configuration and giving improved motion image display performance.

What is claimed is:

1. A vertical alignment liquid crystal display device including a plurality of pixels each having a transmissive region for transmissive display and a reflective region for reflective display surrounding the transmissive region, the vertical alignment liquid crystal display device comprising:

a first substrate;
a second substrate;
a liquid crystal layer which is arranged between the first substrate and the second substrate;
a backlight which is arranged to face a surface of the second substrate opposite to the first substrate and the liquid crystal layer;
a first transparent electrode which is formed on the first substrate and functions as a counter electrode;
an insulating layer which is formed on at least either the first substrate or the second substrate and provided with an aperture such that the wall surface of the insulating layer facing to the aperture forms a sloping face which is inclined to form an acute angle with the substrate on which the insulating layer is formed;
a second transparent electrode which is arranged on part of the second electrode corresponding to the transmissive region and functions as a pixel electrode;
a reflective electrode which is arranged on part of the second substrate corresponding to the reflective region and connected to the second transparent electrode at least at the periphery of the transmissive region and functions as a pixel electrode;
an orientation control means which is arranged on part of either the first substrate or the second substrate located at the center of the transmissive region;
a light shield which prevents light emitted by the backlight from reaching a viewer through discontinuity regions included in a portion of the liquid crystal layer corresponding to the aperture, the discontinuity regions being regions where the orientation of liquid crystal molecules controlled by the orientation control means is discontinuous from the orientation of liquid crystal molecules above the sloping face of the insulating layer, and wherein at least a majority of said light shield is located interior of an inside periphery of said sloping face of the aperture in each of said pixels;

the transmissive region performing transmissive display by transmitting light coming from the backlight through the aperture in the insulating layer, the reflective region performing reflective display by reflecting ambient light; and wherein the light shield comprises different material than the reflective electrode.

2. A vertical alignment liquid crystal display device according to claim 1, wherein the aperture is rectangular when viewed in cross section parallel to the substrate on which the insulating layer is formed.

3. A vertical alignment liquid crystal display device according to claim 1, wherein the light shield is provided along the entire periphery of the aperture.

4. A vertical alignment liquid crystal display device according to claim 1, wherein the light shield is part of the reflective electrode and formed of a connecting part which connects the second transparent electrode and the reflective electrode.

5. A vertical alignment liquid crystal display device according to claim 1, wherein the second substrate is provided with a plurality of switching elements and the light shield is formed of part of wiring material connected to the switching elements.

6. A vertical alignment liquid crystal display device according to claim 1, wherein the first substrate is provided with a black matrix for preventing light from passing through regions between pixels and the light shield is made of the same material as the black matrix.

7. A vertical alignment liquid crystal display device according to claim 1, wherein the aperture includes a receding region formed by shifting part of the wall surface of the insulating layer outward and the light shield is provided in the receding region.

8. A vertical alignment liquid crystal display device including a plurality of pixels each having a transmissive region for transmissive display and a reflective region for reflective display surrounding the transmissive region, the vertical alignment liquid crystal display device comprising:

a first substrate;

a second substrate;

a liquid crystal layer which is arranged between the first substrate and the second substrate;

a backlight which is arranged to face a surface of the second substrate opposite to the first substrate and the liquid crystal layer;

a first transparent electrode which is formed on the first substrate and functions as a counter electrode;

an insulating layer which is formed on at least either the first substrate or the second substrate and provided with an aperture such that the wall surface of the insulating layer facing to the aperture forms a sloping face which is inclined to form an acute angle with the substrate on which the insulating layer is formed;

a second transparent electrode which is arranged on part of the second electrode corresponding to the transmissive region and functions as a pixel electrode;

a reflective electrode which is arranged on part of the second substrate corresponding to the reflective region and connected to the second transparent electrode at least at the periphery of the transmissive region and functions as a pixel electrode;

an orientation control means which is arranged on part of either the first substrate or the second substrate located at the center of the transmissive region; and a light shield which prevents light emitted by the backlight from reaching a viewer through discontinuity regions included in a portion of the liquid crystal layer corresponding to the aperture, the discontinuity, regions being regions where the orientation of liquid crystal molecules controlled by the orientation control means is discontinuous from the orientation of liquid crystal molecules above the sloping face of the insulating layer, the transmissive region performing transmissive display by transmitting light coming from the backlight through the aperture in the insulating layer, the reflective region performing reflective display by reflecting ambient light;

wherein the aperture is rectangular when viewed in cross section parallel to the substrate on which the insulating layer is formed; and wherein the light shield comprises four light shields arranged proximate the four corners, respectively, of the aperture.

9. A vertical alignment liquid crystal display device according to claim 8, wherein the light shields are elongated rectangular in shape.

10. A vertical alignment liquid crystal display device according to claim 9, wherein the light shields for the discontinuity regions located along the long sides of the aperture are elongated more than those arranged along the short sides of the aperture.

11. A vertical alignment liquid crystal display device according to claim 8, wherein the light shields are triangular in shape.

12. A vertical alignment liquid crystal display device including a plurality of pixels each having a transmissive region for transmissive display and a reflective region for reflective display surrounding the transmissive region, the vertical alignment liquid crystal display device comprising:

a first substrate;

a second substrate;

a liquid crystal layer which is arranged between the first substrate and the second substrate;

a backlight which is arranged to face a surface of the second substrate opposite to the first substrate and the liquid crystal layer;

a first transparent electrode which is formed on the first substrate and functions as a counter electrode;

an insulating layer which is formed on at least either the first substrate or the second substrate and provided with an aperture such that the wall surface of the insulating layer facing to the aperture forms a sloping face which is inclined to form an acute angle with the substrate on which the insulating layer is formed;

a second transparent electrode which is arranged on part of the second electrode corresponding to the transmissive region and functions as a pixel electrode;

a reflective electrode which is arranged on part of the second substrate corresponding to the reflective region and connected to the second transparent electrode at least at the periphery of the transmissive region and functions as a pixel electrode;

an orientation control means which is arranged on part of either the first substrate or the second substrate located at the center of the transmissive region; and a light shield which prevents light emitted by the backlight from reaching a viewer through discontinuity regions included in a portion of the liquid crystal layer corresponding to the aperture, the discontinuity regions being regions where the orientation of liquid crystal molecules controlled by the orientation control means is discontinuous from the orientation of liquid crystal molecules above the sloping face of the insulating layer, and wherein at least a majority of said light shield is located interior of an inside periphery of said sloping face of the aperture in each of said pixels;

the transmissive region performing transmissive display by transmitting light coming from the backlight through the aperture in the insulating layer;

the reflective region performing reflective display by reflecting ambient light; and wherein the light shield is arranged within the periphery of the aperture and a predetermined distance away from the edge of the reflective electrode arranged around the periphery of the aperture.

13. A vertical alignment liquid crystal display device including a plurality of pixels each having a transmissive region for transmissive display and a reflective region for reflective display surrounding the transmissive region, the vertical alignment liquid crystal display device comprising:

a first substrate;

a second substrate;

a liquid crystal layer which is arranged between the first substrate and the second substrate;

a backlight which is arranged to face a surface of the second substrate opposite to the first substrate and the liquid crystal layer;

a first transparent electrode which is formed on the first substrate and functions as a counter electrode;

an insulating layer which is formed on at least either the first substrate or the second substrate and provided with an aperture such that the wall surface of the insulating layer facing to the aperture forms a sloping face which is inclined to form an acute angle with the substrate on which the insulating layer is formed;

a second transparent electrode which is arranged on part of the second electrode corresponding to the transmissive region and functions as a pixel electrode;

a reflective electrode which is arranged on part of the second substrate corresponding to the reflective region and connected to the second transparent electrode at least at the periphery of the transmissive region and functions as a pixel electrode;

an orientation control means which is arranged on part of either the first substrate or the second substrate located at the center of the transmissive region;

a light shield arranged along at least part of the periphery of the aperture to prevent light emitted by the backlight from reaching a viewer, and wherein at least a majority of said light shield is located interior of an inside periphery of said sloping face of the aperture in each of said pixels;

the transmissive region performing transmissive display by transmitting light coming from the backlight through the aperture in the insulating layer, the reflective region performing reflective display by reflecting ambient light; and wherein the light shield is arranged within the periphery of the aperture and a predetermined distance away from the edge of the reflective electrode arranged around the periphery of the aperture.

14. A vertical alignment liquid crystal display device according to claim 13, wherein the aperture is rectangular when viewed in cross section parallel to the substrate on which the insulating layer is formed.

15. A vertical alignment liquid crystal display device according to claim 13, wherein the light shield is provided along the entire periphery of the aperture.

16. A vertical alignment liquid crystal display device according to claim 13, wherein the light shield is part of the reflective electrode and formed of a connecting part which connects the second transparent electrode and the reflective electrode.

17. A vertical alignment liquid crystal display device according to claim 13, wherein the second substrate is provided with a plurality of switching elements and the light shield is formed of part of wiring material connected to the switching elements.

18. A vertical alignment liquid crystal display device according to claim 13, wherein the first substrate is provided with a black matrix for preventing light from passing through regions between pixels and the light shield is made of the same material as the black matrix.

19. A vertical alignment liquid crystal display device according to claim 13, wherein the aperture includes a receding region formed by shifting part of the wall surface of the insulating layer outward and the light shield is provided in the receding region.

20. A vertical alignment liquid crystal display device including a plurality of pixels each having a transmissive region for transmissive display and a reflective region for reflective display surrounding the transmissive region, the vertical alignment liquid crystal display device comprising:

a first substrate;

a second substrate;

a liquid crystal layer which is arranged between the first substrate and the second substrate;

a backlight which is arranged to face a surface of the second substrate opposite to the first substrate and the liquid crystal layer;

a first transparent electrode which is formed on the first substrate and functions as a counter electrode;

an insulating layer which is formed on at least either the first substrate or the second substrate and provided with an aperture such that the wall surface of the insulating layer facing to the aperture forms a sloping face which is inclined to form an acute angle with the substrate on which the insulating layer is formed;

a second transparent electrode which is arranged on part of the second electrode corresponding to the transmissive region and functions as a pixel electrode;

a reflective electrode which is arranged on part of the second substrate corresponding to the reflective region and connected to the second transparent electrode at least at the periphery of the transmissive region and functions as a pixel electrode;

an orientation control means which is arranged on part of either the first substrate or the second substrate located at the center of the transmissive region;

a light shield arranged along at least part of the periphery of the aperture to prevent light emitted by the backlight from reaching a viewer, the transmissive region performing transmissive display by transmitting light coming from the backlight through the aperture in the insulating layer, the reflective region performing reflective display by reflecting ambient light;

wherein the aperture is rectangular when viewed in cross section parallel to the substrate on which the insulating layer is formed; and wherein the light shield comprises four light shields arranged proximate the four corners, respectively, of the aperture.

21. A vertical alignment liquid crystal display device according to claim 20, wherein the light shields are elongated rectangular in shape.

22. A vertical alignment liquid crystal display device according to claim 21, wherein the light shields for the discontinuity regions arranged along the long sides of the aperture are elongated more than those arranged along the short sides of the aperture.

23. A vertical alignment liquid crystal display device according to claim 20, wherein the light shields are triangular in shape.

24. A vertical alignment liquid crystal display device including a plurality of pixels each having a transmissive region for transmissive display and a reflective region for reflective display surrounding the transmissive region, the vertical alignment liquid crystal display device comprising:
- a first substrate;
- a second substrate;
- a liquid crystal layer which is arranged between the first substrate and the second substrate;
- a backlight which is arranged to face a surface of the second substrate opposite to the first substrate and the liquid crystal layer;
- a first transparent electrode which is formed on the first substrate and functions as a counter electrode;
- an insulating layer which is formed on at least either the first substrate or the second substrate and provided with an aperture such that the wall surface of the insulating layer facing to the aperture forms a sloping face which is inclined to form an acute angle with the substrate on which the insulating layer is formed;
- a second transparent electrode which is arranged on part of the second electrode corresponding to the transmissive region and functions as a pixel electrode;
- a reflective electrode which is arranged on part of the second substrate corresponding to the reflective region and connected to the second transparent electrode at least at the periphery of the transmissive region and functions as a pixel electrode;
- an orientation control means which is arranged on part of either the first substrate or the second substrate located at the center of the transmissive region;

wherein:
the transmissive region performs transmissive display by transmitting light coming from the backlight,
the reflective region performs reflective display by reflecting ambient light,
the aperture has a polygonal cross-sectional shape in direction parallel to the substrate on which the insulating layer is formed, and
at a corner region of the aperture, a light shield preventing light emitted by the backlight from reaching a viewer is provided, and wherein the light shield comprises different material than the reflective electrode.

* * * * *